(12) United States Patent
Low

(10) Patent No.: US 7,761,859 B2
(45) Date of Patent: Jul. 20, 2010

(54) APPLICATION DEVELOPMENT ENVIRONMENT WITH FEATURES FOR AIDING A USER IN WRITING FUNCTION CALLS

(75) Inventor: Jared L. Low, Pflugerville, TX (US)

(73) Assignee: National Instruments Corporation, Austin, TX (US)

( * ) Notice: Subject to any disclaimer, the term of this patent is extended or adjusted under 35 U.S.C. 154(b) by 790 days.

(21) Appl. No.: 11/003,260

(22) Filed: Dec. 3, 2004

(65) Prior Publication Data

US 2006/0036996 A1  Feb. 16, 2006

Related U.S. Application Data

(60) Provisional application No. 60/601,539, filed on Aug. 13, 2004.

(51) Int. Cl.
*G06F 9/44* (2006.01)
*G06F 9/45* (2006.01)

(52) U.S. Cl. .................. 717/140; 717/105; 717/109; 717/113; 717/148; 717/153

(58) Field of Classification Search .................. None
See application file for complete search history.

(56) References Cited

U.S. PATENT DOCUMENTS

| | | | |
|---|---|---|---|
| 5,724,272 A | 3/1998 | Mitchell et al. | |
| 5,771,388 A | 6/1998 | Mondrik et al. | |
| 6,076,952 A | 6/2000 | Gretta et al. | |
| 6,233,726 B1 * | 5/2001 | Bowman et al. | 717/107 |
| 6,507,351 B1 | 1/2003 | Bixler | |
| 6,546,433 B1 | 4/2003 | Matheson | |
| 6,690,390 B1 | 2/2004 | Walters et al. | |
| 6,781,609 B1 | 8/2004 | Barker et al. | |
| 6,792,598 B2 * | 9/2004 | Burch et al. | 717/136 |
| 6,828,988 B2 | 12/2004 | Hudson et al. | |
| 6,907,580 B2 | 6/2005 | Michelman et al. | |
| 7,069,547 B2 * | 6/2006 | Glaser | 717/154 |
| 7,275,235 B2 | 9/2007 | Molinari et al. | |
| 2002/0186257 A1 | 12/2002 | Cadiz et al. | |
| 2003/0084197 A1 | 5/2003 | Hill et al. | |
| 2004/0001106 A1 | 1/2004 | Deutscher et al. | |

(Continued)

OTHER PUBLICATIONS

Goodyear, et al., "Debugging ASP.NET: Chapter 7—Visual Studio .NET Debugging Environment," New Riders Publishing, 2002, http://www.4guysfromrolla.com/webtech/chapters/VSNETDEBUG/CH07.PDF, 21 pages.

(Continued)

*Primary Examiner*—Chuck O Kendall
(74) *Attorney, Agent, or Firm*—Meyertons Hood Kivlin Kowert & Goetzel, P.C.; Jeffrey C. Hood; Jason L. Burgess

(57) ABSTRACT

One embodiment of the invention comprises a system and method for aiding a user in specifying function parameter values in a computer program. An application development environment (ADE) may be operable to display parameter assistant user interfaces for aiding the user in specifying various function parameter values.

Another embodiment of the invention comprises a system and method for automatically declaring variables passed as parameters in function calls.

37 Claims, 30 Drawing Sheets

U.S. PATENT DOCUMENTS

| | | |
|---|---|---|
| 2004/0032429 A1 | 2/2004 | Shah et al. |
| 2004/0153995 A1 | 8/2004 | Polonovski |
| 2004/0221262 A1 | 11/2004 | Hampapuram et al. |
| 2005/0028107 A1 | 2/2005 | Gomes et al. |
| 2005/0076002 A1 | 4/2005 | Williams et al. |

OTHER PUBLICATIONS

"Introduction to the VC++.NET Debugger," East Tennessee State University, (http://csciwww.etsu.edu/blair/Using_Debugger.htm), Aug. 10, 2002, 11 pages.

"Introduction to Visual C++ Debugging," Department of Computer Science, Virginia Tech, (http://ei.cs.vt.edu/~cs1205/c_debug/intro.html), 1997, 7 pages.

"Microsoft Word 2000," see included figures that depict a tool tip that accepts user input, 1999, 2 pages.

Berger, "Gates casts Visual Studio .Net," InfoWorld News, http://www.infoworld.com/articles/hn/xml/02/02/13/020213hngates2.html, Feb. 13, 2002, 1 page.

* cited by examiner

```
c:\...\National Instruments\CVI71\samples\userint\panels.cws - [panels.c *]
File  Edit  View  Build  Run  Instrument Library  Tools  Window  Options  Help  Debug /* This is the application's entry-point.                              */
/*---------------------------------------------------------------------*/
int main (int argc, char *argv[])
{
    int hparent;

if (InitCVIRTE (0, argv, 0) == 0)
        return -1;

/* Load all of the panels for this sample.  Notice that we pass the   */
    /* desired parent as the first parameter to LoadPanel when loading the*/
    /* child.                                                             */

NewCtrl (panel, CTRL_TREE
    hparent       2 int NewCtrl (int PanelHandle, int ControlStyle ..., char ControlLabel[], int ControlTop, int ControlLeft)
    g_hchild1   = LoadPanel (hparent, "panels.uir", CHILD1);
    g_hgrandchild1 = LoadPanel (g_hchild1, "panels.uir", GRNDCHILD1);
    g_hchild2   = LoadPanel (hparent, "panels.uir", CHILD2);
    g_hgrandchild2 = LoadPanel (g_hchild2, "panels.uir", GRNDCHILD2);

/* Display the main parent panel (children are not automatically */
    /* displayed) and run the UI.                                    */
    DisplayPanel (hparent);
    RunUserInterface();

/* Free resources and return -- discarding a parent discards all children*/
    DiscardPanel (hparent);

40/96    30 C S    Ins
```

FIG. 11

```
/* This is the application's entry-point.             */
/*-----------------------------------------------------*/
int main (int argc, char *argv[])
{
    int hparent;

if (InitCVIRTE (0, argv, 0) == 0)
        return -1;

/* Load all of the panels for this sample. Notice that we pass the   */
    /* desired parent as the first parameter to LoadPanel when loading the */
    /* child.                                                              */
    SetCtrlAttribute (panel, ctrl,
    2 int SetCtrlAttribute (int PanelHandle, int ControlID, int ControlAttribute ...[...])
    g_hchild1 = LoadPanel (hparent, "panels.uir", CHILD1);
    g_hgrandchild1 = LoadPanel (g_hchild1, "panels.uir", GRNDCHILD1);
    g_hchild2 = LoadPanel (hparent, "panels.uir", CHILD2);
    g_hgrandchild2 = LoadPanel (g_hchild2, "panels.uir", GRNDCHILD2);

/* Display the main parent panel (children are not automatically   */
    /* displayed) and run the UI.                                       */
    DisplayPanel (hparent);
    RunUserInterface ();

/* Free resources and return -- discarding a parent discards all children*/
```

APPLICATION DEVELOPMENT ENVIRONMENT WITH FEATURES FOR AIDING A USER IN WRITING FUNCTION CALLS

PRIORITY CLAIM

This application claims benefit of priority of U.S. Provisional Application Ser. No. 60/601,539 titled "Application Development Environment with Features for Increasing the Ease and Efficiency of Writing Function Calls," filed Aug. 13, 2004, whose inventor was Jared Low.

FIELD OF THE INVENTION

The present invention relates to the field of software programming, and more particularly to a system and method for aiding users in creating function calls in computer programs.

DESCRIPTION OF THE RELATED ART

For most text-based computer programming languages, writing a program involves writing function or method calls and other statements so that a desired sequence of operations is performed. Functions and methods may themselves include calls to other functions or methods. A typical program includes many function or method calls. Thus, writing various function and method calls is typically a large part of the user's task in the process of writing a computer program.

Functions or methods may take various parameters, e.g., parameters that affect the operation of the function or method, or parameters that receive values set by the function or method. Thus, including a function or method call in a program usually involves specifying the appropriate parameters to pass to the function or method. A function or method typically has a definition, e.g., a prototype or signature, that specifies the order of the parameters and their data types. Users often do not know a function's parameters by heart and must consult references such as online help or manuals to determine the parameters that the function or method takes and the meanings of the parameters. It would be desirable to aid the user in viewing help text regarding a function and its parameters and to make the task of viewing the help text a more seamless part of the programming experience.

Once the user knows the function's parameters, he must still determine and insert the appropriate values to pass for those parameters. It would be desirable to aid the user in configuring a function or method call with the desired parameter values.

The term "variable" generally refers to a named memory location in which a program can store intermediate results and from which it can then read them. In many programming languages, a variable must be declared or defined before it can be used. For example, a variable declaration may specify the data type of the variable.

Variables are often passed as parameters in function or method calls. For example, the user may pass a variable (or its address) to receive a value set by the function or method. In this situation, a user often writes the function or method call first and then adds the declaration(s) for the variable(s) passed as parameters. Adding the variable declaration(s) is usually simple to do, but it can seem to the user as a distracting formality required by the compiler. It would be desirable to provide a system capable of automatically adding variable declarations for variables passed as parameters in function or method calls.

SUMMARY OF THE INVENTION

One embodiment of the present invention comprises a system and method for aiding a user in specifying function parameter values in a computer program. According to one embodiment, an application development environment (ADE) may be operable to display graphical user interfaces referred to herein as "parameter assistant user interfaces" for aiding the user in specifying various function parameter values.

In one embodiment the ADE may be operable to display a prototype tip showing the prototype for a function (or method) F near a function (or method) call to the function F in the source code of the user's program. The function F may take one or more parameters, including a parameter P. The ADE may be operable to assist the user in selecting a parameter value for the parameter P, i.e., may assist the user in creating the function call to the function F, where the selected value for the parameter P is passed to the function F in the function call.

In one embodiment the ADE may display a button for the parameter P, e.g., may display the button within the prototype tip. The user may click the button or provide other input to cause the ADE to display a graphical user interface for selecting a parameter value for the parameter P. The graphical user interface is also referred to herein as a parameter assistant user interface. The parameter assistant user interface may have associated functionality for aiding the user in selecting a parameter value for the parameter P. In various embodiments the parameter assistant user interface may be operable to display a graphical user interface of any kind and may have functionality of any kind for aiding the user in selecting a parameter value, e.g., depending on the meaning of the parameter P.

In one embodiment the functionality of the parameter assistant user interface may vary depending on dynamically determined conditions, or the parameter values presented to the user by the parameter assistant user interface may be dynamically determined. As one example, the parameter assistant user interface may be operable to dynamically determine a set of valid parameter values for the parameter P based on current conditions, such as the current state or configuration of the computer system, the type or current configuration of devices coupled to the computer system, the current state of data stored in a file on the computer system, etc.

In one embodiment, functionality for displaying parameter assistant user interfaces for various function parameters may be built in to the ADE. For example, the ADE may provide various standard function libraries that are installed on the user's computer system when the ADE is installed. The ADE may be operable to display parameter assistant user interfaces for various parameters of functions in the standard function libraries.

In one embodiment the ADE may also allow third-party software developers to create a library of functions wherein one or more parameters of one or more of the functions in the library have associated parameter assistant user interfaces. For example, the ADE may provide a framework allowing a third-party developer to customize various function parameters so that they have a parameter assistant user interface for aiding end users in selecting a parameter value. When end users write a function call in their program for a function with a parameter that has been customized by the third-party developer, the ADE may display a button for invoking the parameter assistant user interface for the customized parameter, as described above.

In another embodiment, the ADE may be operable to automatically implement a parameter assistant user interface for certain parameters in function libraries created by third-party software developers, without requiring the third-party developers to explicitly customize the parameters.

Another embodiment of the invention comprises a system and method for automatically declaring variables passed as parameters in function calls. According to one embodiment, an application development environment (ADE) may be operable to detect that a cursor of a source code window for a computer program is positioned within a function call at a parameter P of a function F. The function call may be configured to pass a variable (or address of a variable) as the value for the parameter P, where the variable has not yet been declared.

In one embodiment the user may press a hotkey keystroke or keystroke combination, may select a menu item from a menu bar or context menu, or may provide other user input indicating a desire for a variable declaration for the undeclared variable to be added to the program. In response, the ADE may automatically determine an appropriate location for the variable declaration and may automatically insert source code at that location to declare the variable. In an embodiment in which the programming language utilizes program blocks, such as the C language for example, the variable declaration may be inserted at or near the beginning of the current program block, i.e., at or near the beginning of the block where the cursor is currently located.

The ADE may analyze the function prototype or other information regarding the function to determine the appropriate data type for the variable declaration. Some functions may have parameters whose data type can vary, e.g., based on the actual values of previous parameters. In one embodiment the ADE may be operable to determine the appropriate data type for the undeclared variable based on the values of other parameters passed in the function call. If the user attempts to declare a variable for a function parameter whose type can vary and the ADE cannot automatically determine which type the variable should be then the ADE may prompt the user to specify or select the correct data type for the variable.

Some function parameters may have an array data type. If the user requests the ADE to automatically declare a variable for an array parameter, the ADE may prompt the user to specify the number of array elements for the variable declaration. The ADE may then declare the variable so that it has the specified number of array elements.

BRIEF DESCRIPTION OF THE DRAWINGS

A better understanding of the present invention can be obtained when the following detailed description of the preferred embodiment is considered in conjunction with the following drawings, in which:

FIG. 6 illustrates a simple example of a parameter assistant user interface for the "Mode" parameter of an "fopen" function;

FIG. 9 illustrates the program source code after the user has selected a parameter value from the parameter assistant user interface of FIG. 8;

FIG. 11 illustrates a program in which the user is currently creating a function call to a "DS_Open" function;

FIG. 13 illustrates a program in which the user is currently creating a function call to a "SetCtrlAttribute" function;

FIG. 22 illustrates the program of FIG. 21 after the user has invoked a text box displaying help for the "Filename" parameter of the "LoadPanel" function;

Figure 1:
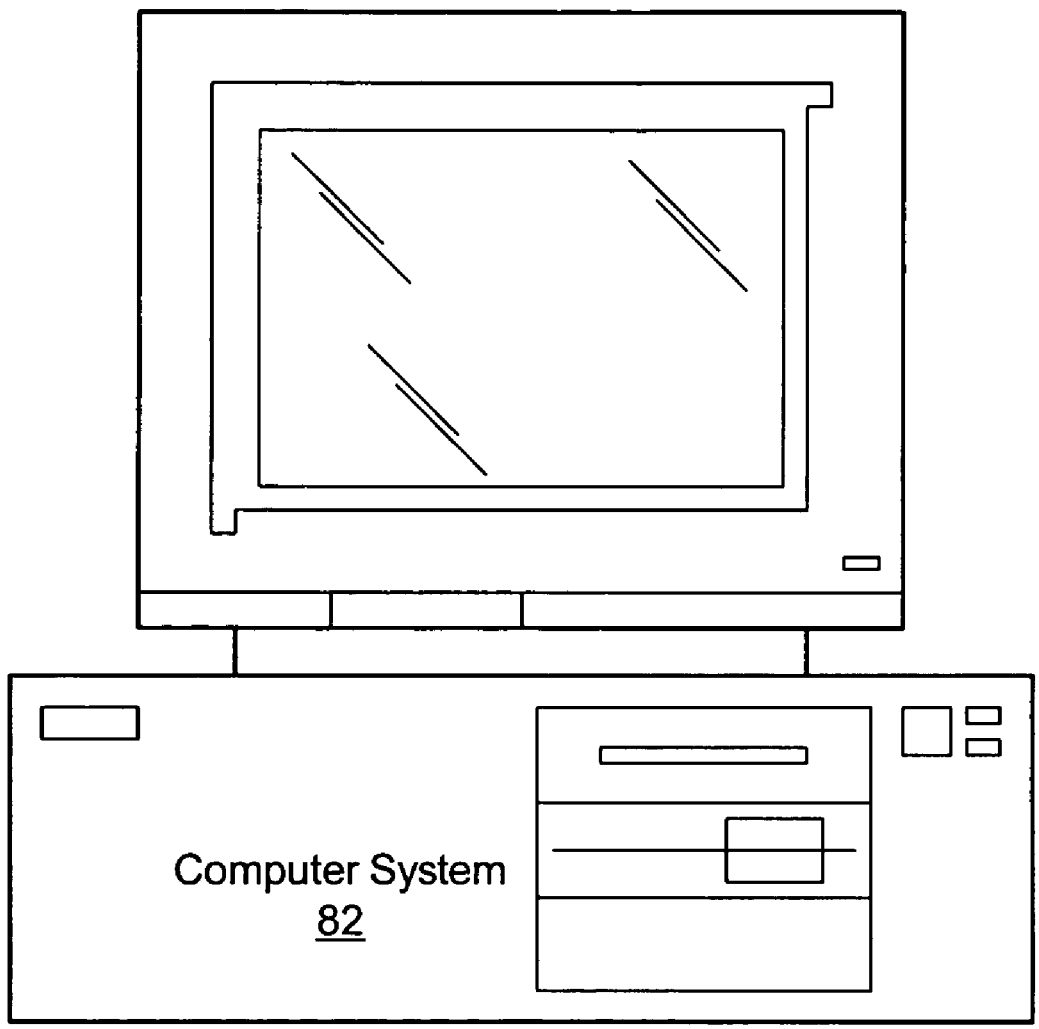
FIG. 1 illustrates a computer system operable to execute an application development environment (ADE) application that provides features for aiding users in writing function or method calls.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Application Development Environment—a program useable to create a software program. For example, the application development environment (ADE) may be operable to display a source code window in which the user can edit the program.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Graphical User Interface (GUI)—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a window, panel, or dialog having one or more GUI Elements, or may comprise a plurality of individual GUI Elements (or individual windows each having one or more GUI Elements), wherein the individual GUI Elements or windows may optionally be tiled together.

Graphical User Interface (GUI) Element—an element of a graphical user interface, such as for providing input or displaying output. Exemplary graphical user interface elements comprise input controls and output indicators FIG. 1—Computer System FIG. 1 illustrates a computer system 82 operable to execute an application development environment (ADE) application to create a software program. As described above, creating the software program may comprise including one or more function or method calls in the software program and configuring the function or method calls with appropriate parameter values. In one embodiment, the ADE may provide features for aiding the user in writing function or method calls for the software program. For example, in one embodiment the ADE may be operable to display graphical user interfaces referred to herein as "parameter assistant user interfaces" for aiding the user in specifying various parameter values to insert in function or method calls. In another embodiment the ADE may provide features for increasing the user's ease and efficiency of viewing help text related to a function or method call. In another embodiment the ADE may be operable to automatically declare variables passed as parameters in function calls. Each of these embodiments is described in detail below.

As shown in FIG. 1, the computer system 82 may include a display device operable to display the program as the program is being created. As described in detail below, the display device may also display a parameter assistant user interface with which the user can interact to select a desired parameter value for a function or method parameter. The ADE may be operable to programmatically (automatically) include the selected parameter value in the user's program. The display device may also display help text for parameters of a function or method, e.g., where the help text appears in or appears overlayed on the source code for the program, as described below.

The computer system 82 may also include a memory medium(s) on which one or more computer programs or software components according to one embodiment of the present invention may be stored. For example, the memory medium may store an application development environment (ADE) program operable to aid the user in creating function calls, as described below. In one embodiment the memory medium may also store information or programs that the ADE utilizes to determine valid parameter values for various functions, such as hardware configuration information or device software. The memory medium may also store operating system software, as well as other software for operation of the computer system.

Figure 2:
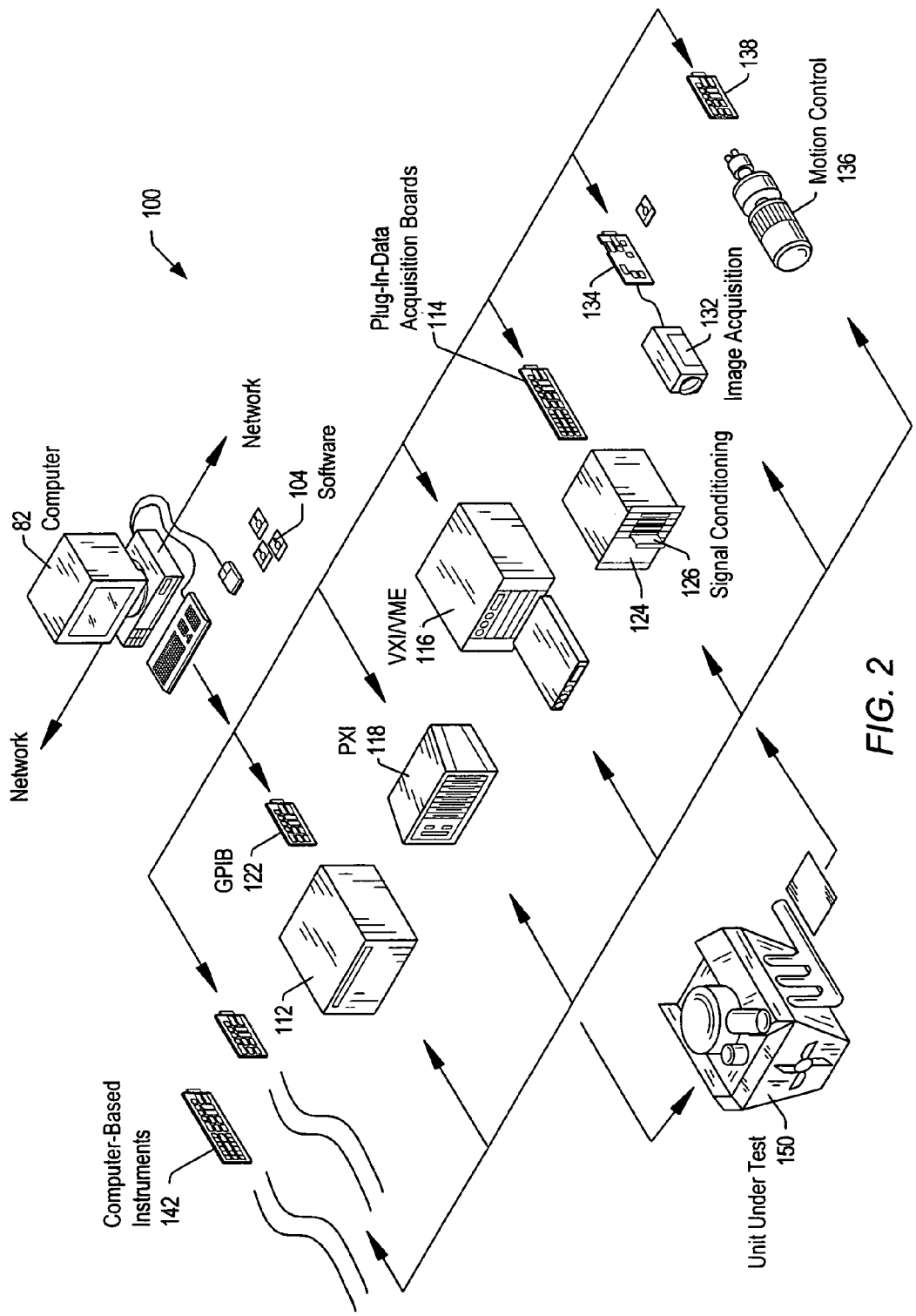
FIG. 2 illustrates an exemplary instrumentation control system.

FIG. 2—Exemplary Instrumentation Control System

Computer systems are used to interact with hardware devices or instruments in many fields, including the fields of test and measurement, process control, industrial automation, simulation, machine vision, motion control, and multimedia, among others. For example, a computer system may interact with instruments to measure and/or control various types of systems. These systems may include any of various types of physical, mechanical, electrical, chemical, or thermodynamic elements or phenomena, among others, or some combination of such elements or phenomena. Exemplary systems include: an engine or an engine component, a device in motion, a chemical reaction, a petroleum refining process, a room maintained at a setpoint temperature, a system of liquids flowing among different tanks, etc.

Users commonly create computer programs to interact with the devices or instruments connected to or included in a computer system. Creating a program to interact with hardware devices typically involves including function calls or invocations to various functions or methods in the program. For example, functions or methods of a GPIB application programming interface (API) may be included in the program to interact with GPIB devices, functions or methods of a DAQ API may be included in the program to interact with DAQ devices, etc.

Embodiments of the present invention may be involved with creating software programs to perform test and/or measurement functions; control and/or model instrumentation or industrial automation hardware; perform modeling and simulation functions, e.g., modeling or simulating a device or product being developed or tested, etc. Exemplary test applications include hardware-in-the-loop testing and rapid control prototyping, among others.

However, it is noted that the present invention can be used in the creation of software programs for a plethora of applications and is not limited to the above applications. In other words, applications discussed in the present description are exemplary only, and the system and methods described herein may be used to create software programs for any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

FIG. 2 illustrates an exemplary instrumentation control system 100. It is noted that FIG. 2 is exemplary only, and the present invention may be used in conjunction with any of various systems, as desired. The system 100 comprises a host computer 82 that connects to one or more instruments. The host computer 82 comprises a CPU, a display device, memory, and one or more input devices such as a mouse or keyboard as shown.

The computer 82 may execute an application development environment (ADE) program such as described above with reference to FIG. 1. In one embodiment, the ADE may be utilized to create a software program for execution on the computer 82 for analyzing, measuring, and/or controlling a unit under test (UUT) or process 150. The software program may interact with the one or more instruments to analyze, measure, or control the unit under test (UUT) or process 150. For example, the software program may include one or more function or method calls that were configured with parameter values corresponding to resources of the one or more instruments.

In another embodiment, the ADE may be utilized to create a software program intended for execution on a different computer system 90 (not shown). For example, the computer system 82 may execute the ADE to create the software program, and the software program may then be deployed on the computer system 90 for execution. In another embodiment, the computer system 90 may execute the ADE to create the software program, and the software program may then be deployed on the computer system 82 for execution.

In one embodiment, the user may select a target device from among the devices or instruments coupled to the computer 82. The software program may be created on the computer 82 and then deployed to the target device for execution. In one embodiment, the target device may be remotely located from the computer 82 and coupled to the computer 82 through a network. For example, one or more of the various devices may be coupled to the computer 82 or coupled to each other via a network, such as the Internet.

Referring again to FIG. 2, the one or more instruments of the instrumentation control system 100 may include a GPIB instrument 112 and associated GPIB interface card 122, a data acquisition board 114 and associated signal conditioning circuitry 124, a VXI instrument 116, a PXI instrument 118, a video device 132 and associated image acquisition card 134, a motion control device 136 and associated motion control interface card 138, and/or one or more computer based instrument cards 142, among other types of devices.

The GPIB instrument 112 may be coupled to the computer 82 via a GPIB interface card 122 provided by the computer 82. In a similar manner, the video device 132 may be coupled to the computer 82 via the image acquisition card 134, and the motion control device 136 may be coupled to the computer 82 through the motion control interface card 138. The data acquisition board 114 may be coupled to the computer 82, and optionally interfaces through signal conditioning circuitry 124 to the UUT. The signal conditioning circuitry 124 may include an SCXI (Signal Conditioning extensions for Instrumentation) chassis comprising one or more SCXI modules 126.

The GPIB card 122, the image acquisition card 134, the motion control interface card 138, and the DAQ card 114 are typically plugged in to an I/O slot in the computer 82, such as a PCI bus slot, a PC Card slot, or an ISA, EISA or Micro-Channel bus slot provided by the computer 82. However, these cards 122, 134, 138 and 114 are shown external to computer 82 for illustrative purposes. The cards 122, 134, 138 and 114 may also be implemented as external devices coupled to the computer 82, such as through a serial bus.

The VXI chassis or instrument 116 may be coupled to the computer 82 via a serial bus, MXI bus, or other serial or parallel bus provided by the computer 82. The computer 82 preferably includes VXI interface logic, such as a VXI, MXI or GPIB interface card (not shown), which interfaces to the VXI chassis 116. The PXI chassis or instrument is preferably coupled to the computer 82 through the computer's PCI bus.

A serial instrument (not shown) may also be coupled to the computer 82 through a serial port, such as an RS-232 port, USB (Universal Serial bus) or IEEE 1394 or 1394.2 bus, provided by the computer 82. In typical systems an instrument will not be present of each interface type, and in fact many systems may only have one or more instruments of a single interface type, such as only GPIB instruments.

The instruments may be coupled to the unit under test (UUT) or process 150, or may be coupled to receive field signals, typically generated by transducers. Other types of instruments or devices may be connected to the system, as desired.

Figure 3:
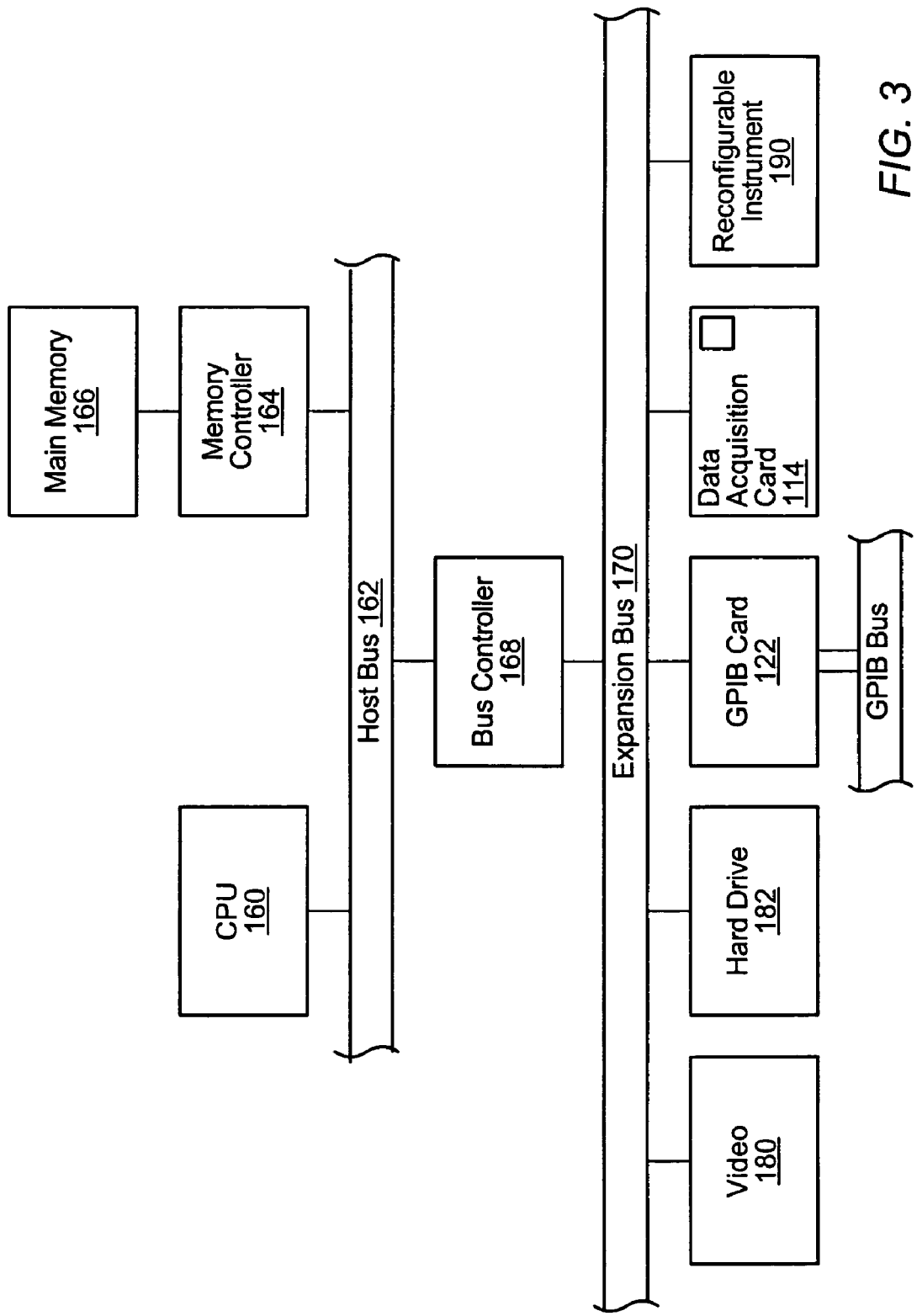
FIG. 3 is a diagram illustrating one embodiment of the computer system shown in FIGS. 1 and 2.

FIG. 3—Computer System Block Diagram

FIG. 3 is a diagram of the computer system 82 illustrated in FIGS. 1 and 2, according to one embodiment. It is noted that any type of computer system configuration or architecture can be used as desired, and FIG. 3 illustrates a representative PC embodiment. It is also noted that the computer system may be a general purpose computer system, a computer implemented on a VXI card installed in a VXI chassis, a computer implemented on a PXI card installed in a PXI chassis, or other types of embodiments. Elements of a computer not necessary to understand the present invention have been omitted for simplicity.

The computer 82 includes at least one central processing unit or CPU 160 that is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164. The main memory 166 may store software according to one embodiment of the invention, such as the software described above with reference to FIG. 1. The main memory 166 may also store operating system software as well as other software for operation of the computer system, as well known to those skilled in the art. The CPU 160 executing code and data from the main memory 166 may comprise a means for implementing the methods described below.

The host bus 162 is coupled to an expansion or input/output bus 170 by means of a bus controller 168 or bus bridge logic. The expansion bus 170 may be the PCI (Peripheral Component Interconnect) expansion bus, although other bus types can also be used. The expansion bus 170 may include slots for various devices such as the data acquisition board 114 (of FIG. 2) and a GPIB interface card 122 that provides a GPIB bus interface to the GPIB instrument 112 (of FIG. 2). A video display subsystem 180 and hard drive 182 coupled to the expansion bus 170 is also shown.

In one embodiment, a reconfigurable instrument 190 may also be connected to the computer 82. The reconfigurable instrument 190 may include a functional unit, also referred to as configurable logic, such as a programmable logic device (PLD), e.g., an FPGA, or a processor and memory, which may execute a real time operating system. Program instructions may be downloaded and executed on the reconfigurable instrument 190. In another embodiment, the functional unit may be included on an instrument or device connected to the computer 82 through means other than an expansion slot, e.g., the instrument or device may be connected via an IEEE 1394 bus, USB, or other type of port. Also, the functional unit may be included on a device such as the data acquisition board 114 or another device shown in FIG. 2.

Figure 4:
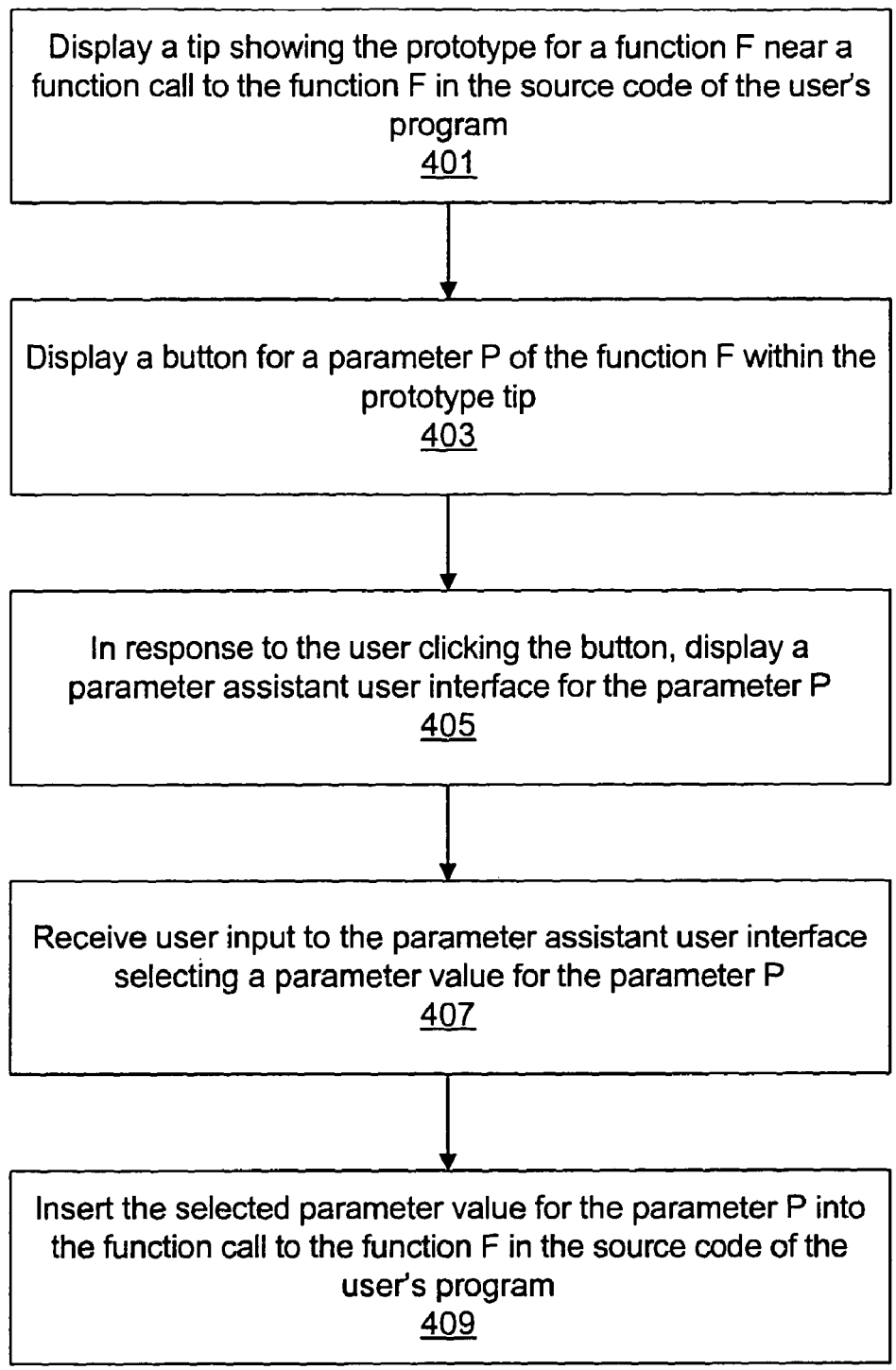
FIG. 4 is a flowchart diagram illustrating one embodiment of a method for aiding a user in specifying a value for a parameter P in a function F by displaying a parameter assistant user interface for the parameter P.

FIG. 4—Parameter Assistant for Selecting Parameter Values

One embodiment of the application development environment (ADE) may be operable to display graphical user interfaces referred to herein as "parameter assistant user interfaces" for aiding the user in specifying various function parameter values in the user's program. FIG. 4 is a flowchart diagram illustrating one embodiment of a method for aiding the user in specifying a value for a parameter P in a function (or method) F by displaying a parameter assistant user interface for the parameter P. It is noted that FIG. 4 illustrates a representative embodiment, and alternative embodiments are contemplated.

As shown in 401, in one embodiment the ADE may be operable to display a prototype tip showing the prototype for the function (or method) F near a function (or method) call to the function F in the source code of the user's program. Thus, as used herein, the term "prototype tip" refers to any of various types or ways to display information regarding a prototype or structure of a function, wherein the information is displayed in the source code of a user's program proximate to a call or other invocation of the function or method to which the prototype tip relates.

For example, in one embodiment the ADE may detect when the user is currently creating or typing in a function call to the function F and may automatically display the prototype tip showing the prototype for the function F in response. The ADE may use any technique to determine when the user is typing in a function call. For example, for a programming language such as C, the ADE may display the prototype tip when the user has entered the function name of the function F and an open parenthesis, e.g., "FunctionName (". The ADE may also display the prototype tip for the function F in response to the user moving the cursor to an existing function call to the function F in the user's program.

In another embodiment the ADE may not automatically display the prototype tip for the function F when the user is currently creating or typing in a function call to the function F or when the user moves the cursor to (proximate to) an existing function call to the function F. Instead the prototype tip may only be displayed when the user requests it to be displayed. For example, in one embodiment the user may press a hotkey keystroke or keystroke combination such as "Ctrl+Shift+Space" when the cursor is placed at or within a function call to the function F, which may cause the prototype tip for the function F to be displayed. In another embodiment the user may select a menu item requesting the prototype tip for the function F to be displayed.

Figure 5:
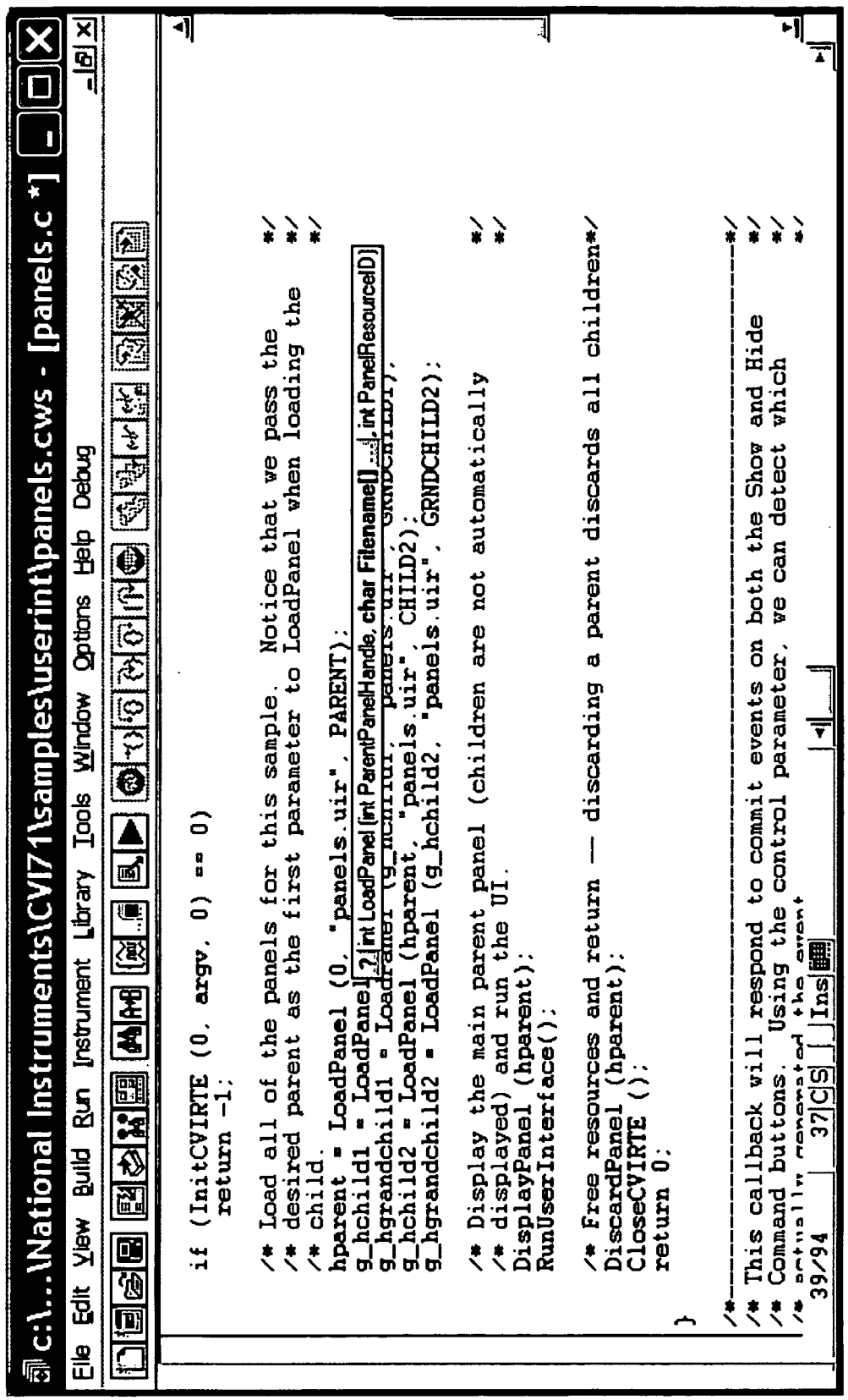
FIG. 5 illustrates a user's program in which a prototype tip for a function is currently displayed.

In various embodiments, the prototype tip for the function F may have various appearances and may be displayed at various locations. In one embodiment the prototype tip is displayed within the source code window itself (e.g., not in a separate window) and is displayed near the function call, so that the user can conveniently view the prototype for the function F while editing or viewing the function call. In one embodiment the prototype tip may be of a transient nature, e.g., may be displayed only temporarily and may disappear once the user has moved the cursor away from the function call. In another embodiment the user may explicitly request the prototype tip to be displayed and removed, e.g., using hotkey keystrokes. The prototype tip may have a visual appearance to allow the user to easily distinguish it from the actual source code of the user's program. For example, FIG. 5 illustrates a user's program in which a prototype tip for a "LoadPanel" function is currently displayed.

The function F may take one or more parameters, including a parameter P as noted above. As described below, the ADE may be operable to assist the user in selecting a parameter value for the parameter P, i.e., may assist the user in creating a function call to the function F, where the selected value for the parameter P is passed to the function F in the function call. In one embodiment the ADE may display a button for the parameter P, e.g., may display the button within the prototype tip, as indicated in 403. The button may comprise a GUI element or display area which the user can click or provide other input to. As shown in 405, the user may click (or provide other input to) the button to cause the ADE to display a graphical user interface for selecting a parameter value for the parameter P. The graphical user interface is also referred to herein as a parameter assistant user interface. The parameter assistant user interface may have associated functionality for aiding the user in selecting a parameter value for the parameter P. As described below, in various embodiments the parameter assistant user interface may be operable to display a graphical user interface of any kind and may have functionality of any kind for aiding the user in selecting a parameter value, e.g., depending on the meaning of the parameter P.

In various embodiments the button for the parameter P may have any of various appearances. In one embodiment the button may be labeled with an ellipsis " . . . " label to visually indicate that the user can click the button to cause the parameter assistant user interface to be displayed. The button may also be displayed at any of various positions within the prototype tip, but is preferably displayed close to where the parameter P is listed in the prototype so that the user intuitively knows that the button corresponds to the parameter P. In one embodiment the button is displayed inline with the prototype tip immediately after the parameter P. For example, in FIG. 5 an ellipsis button for invoking a parameter assistant user interface for the "Filename" parameter of the "LoadPanel" function is displayed in the prototype tip immediately after the "Filename" parameter.

As noted above, the prototype tip may be displayed near the function call where the cursor is currently located. Thus, the button for the parameter P may be located within the prototype tip near the user's focus of attention. This may enable the user to quickly click the button to invoke the parameter assistant user interface for the parameter P. In one embodiment the button for the parameter P may only appear within the prototype tip if the parameter P is the active parameter, i.e., only if the cursor is positioned within the function call at the parameter P's position. For example, if the function F also takes a parameter Q and the cursor is located within the function call at the parameter Q's position then the ADE may display a button for invoking a parameter assistant user interface for the parameter Q (if the parameter Q is configured to have a parameter assistant user interface) instead of displaying a button for invoking a parameter assistant user interface for the parameter P. This may enable the user to locate the button for the active parameter more quickly. In another embodiment the ADE may display multiple buttons simultaneously for launching parameter assistant user interfaces for different parameters in the function F.

It is noted that in other embodiments the button for the parameter P may be displayed in locations other than within the prototype tip. For example, in one embodiment the ADE may not display a prototype tip for the function F but may simply display the button by itself when the user positions the cursor at the parameter position for the parameter P within the function call, or the ADE may display the button together with the data type and parameter name for the parameter P but may not display the rest of the prototype for the function F. Also, in other embodiments the user may interact with or provide input to another kind of GUI element other than a button in order to invoke the parameter assistant user interface for the parameter P. In various embodiments the parameter assistant user interface may be invoked in response to the user providing input to any kind of GUI element.

Also, in other embodiments the user may be able to launch the parameter assistant user interface for the parameter P through techniques other than interacting with a GUI element. For example, a hotkey keystroke combination may be assigned so that the parameter assistant user interface for the current parameter (i.e., the parameter where the cursor is currently located in a function call in the source code window) is displayed in response to the user pressing the keystroke combination. In another embodiment the user may select a menu item requesting the parameter assistant user interface for the current parameter to be displayed.

As noted above, in 405 the parameter assistant user interface for the parameter P may be displayed in response to the user clicking the displayed button that corresponds to the parameter P or otherwise providing input indicating a desire to view the parameter assistant user interface for the parameter P. As indicated in 407, the user may then interact with the parameter assistant user interface to select a parameter value for the parameter P.

In various embodiments the parameter assistant user interface for the parameter P may have any kind of visual appearance and may be operable to perform any functionality to aid the user in selecting a parameter value for the parameter P. The appearance and functionality of the parameter assistant user interface for the parameter P may depend on the purpose of the parameter P itself or the meaning of the parameter P for the function F. Thus, different parameters for different functions may have different parameter assistant user interfaces to aid the user in selecting values for the respective parameters.

In one embodiment the parameter assistant user interface may be displayed in a separate window, i.e., a different window than the source code window for the user's program. The separate window may be movable and possibly resizable. In another embodiment the parameter assistant user interface may be displayed directly within the source code window for the user's program, e.g., may not appear to the user as a separate window. Displaying the parameter assistant user interface directly within the source code window for the user's program may be appropriate for certain simple displays that are relatively small in size.

Figure 6:
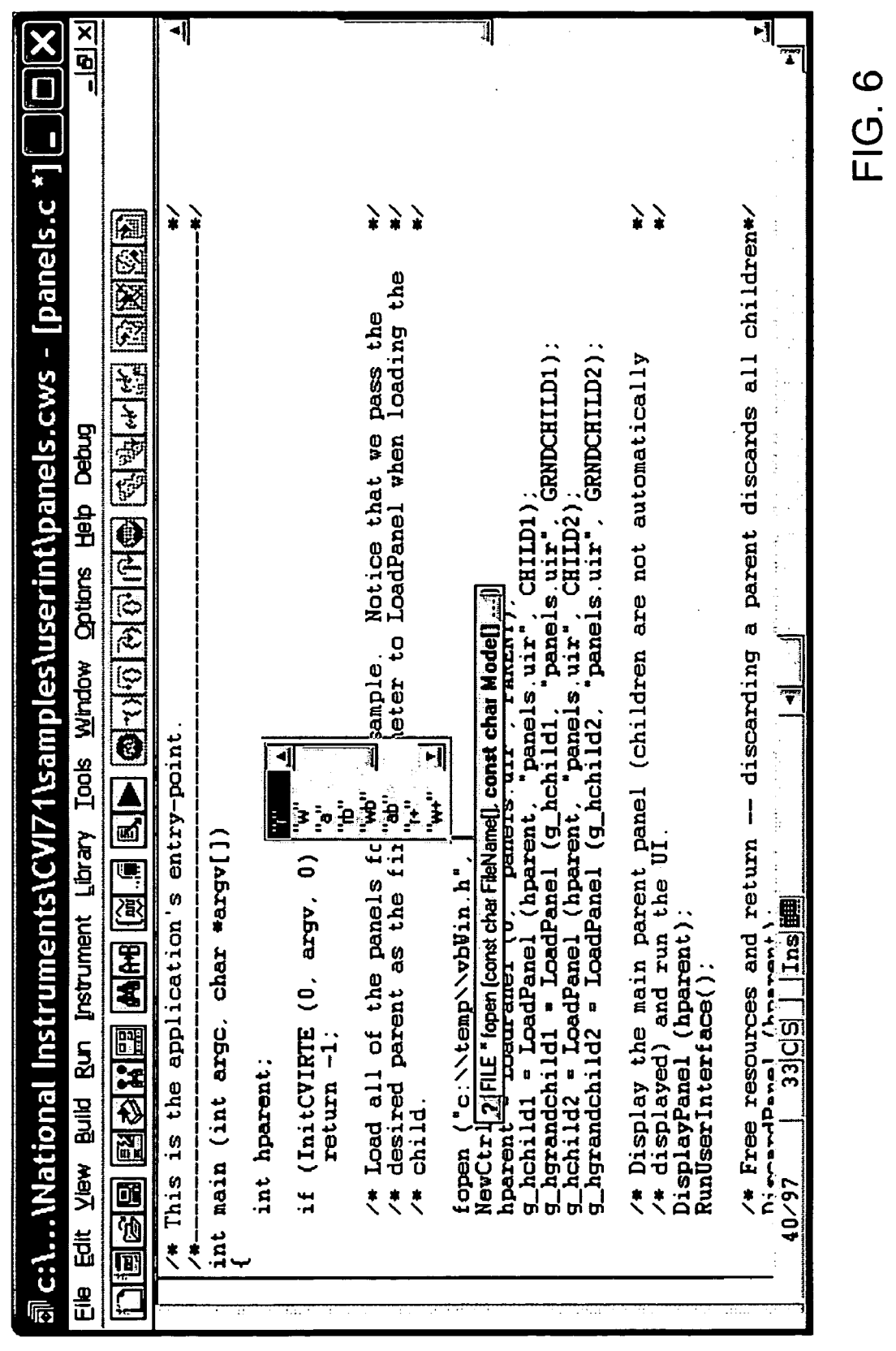
Figure 7:
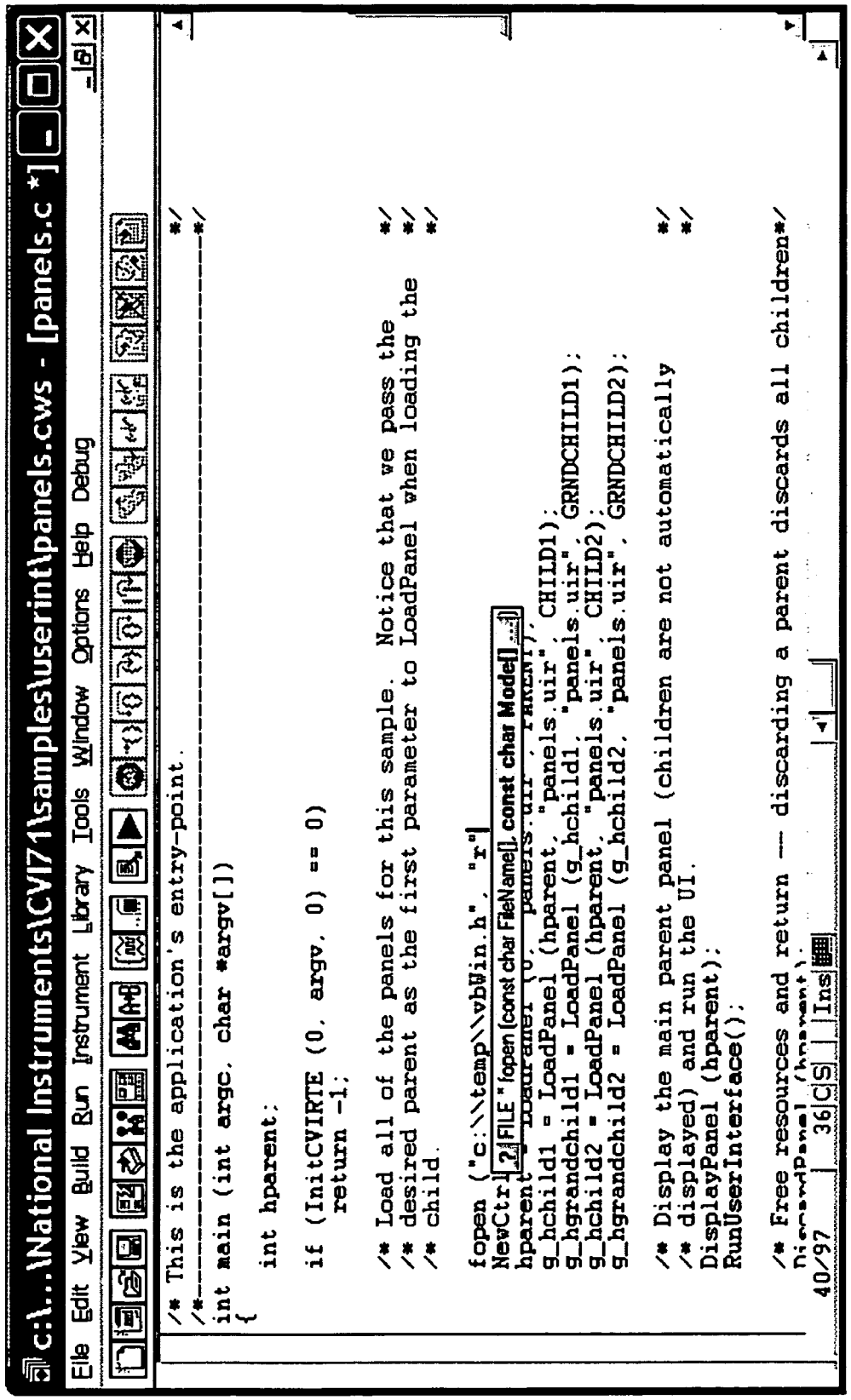
FIG. 7 illustrates the program source code after the ADE has automatically inserted a parameter value selected using the parameter assistant user interface of FIG. 6 into a function call.

As one simple example of a parameter assistant user interface, consider a parameter P whose value can take on one of a fixed set of parameter values (e.g., can be one string from a set of strings, or one integer from a set of integers, or one constant from a set of constants, etc.). In this case, the parameter assistant user interface for the parameter P may comprise a simple user interface that allows the user to easily select the desired value from a list. In one embodiment the parameter assistant user interface may also display text indicating the meaning of each parameter value rather than just the parameter values themselves, which may help the user select the appropriate parameter value. FIG. 6 illustrates a simple example of a parameter assistant user interface for the "Mode" parameter of an "fopen" function. The user may click the ellipsis button displayed after the "Mode" parameter in the prototype tip to cause the illustrated parameter assistant user interface to be displayed. In this example the parameter assistant user interface is displayed directly within the source code window for the user's program, and it simply displays a list of valid string values for the "Mode" parameter of the "fopen" function. The user may select a desired string to cause it to be inserted in the user's program. For example, FIG. 7 illustrates the program source code after the user selects the string value "r" from the displayed list. As shown, the ADE has automatically inserted the string "r" as the parameter value for the "Mode" parameter in the user's "fopen" function call.

Figure 8:
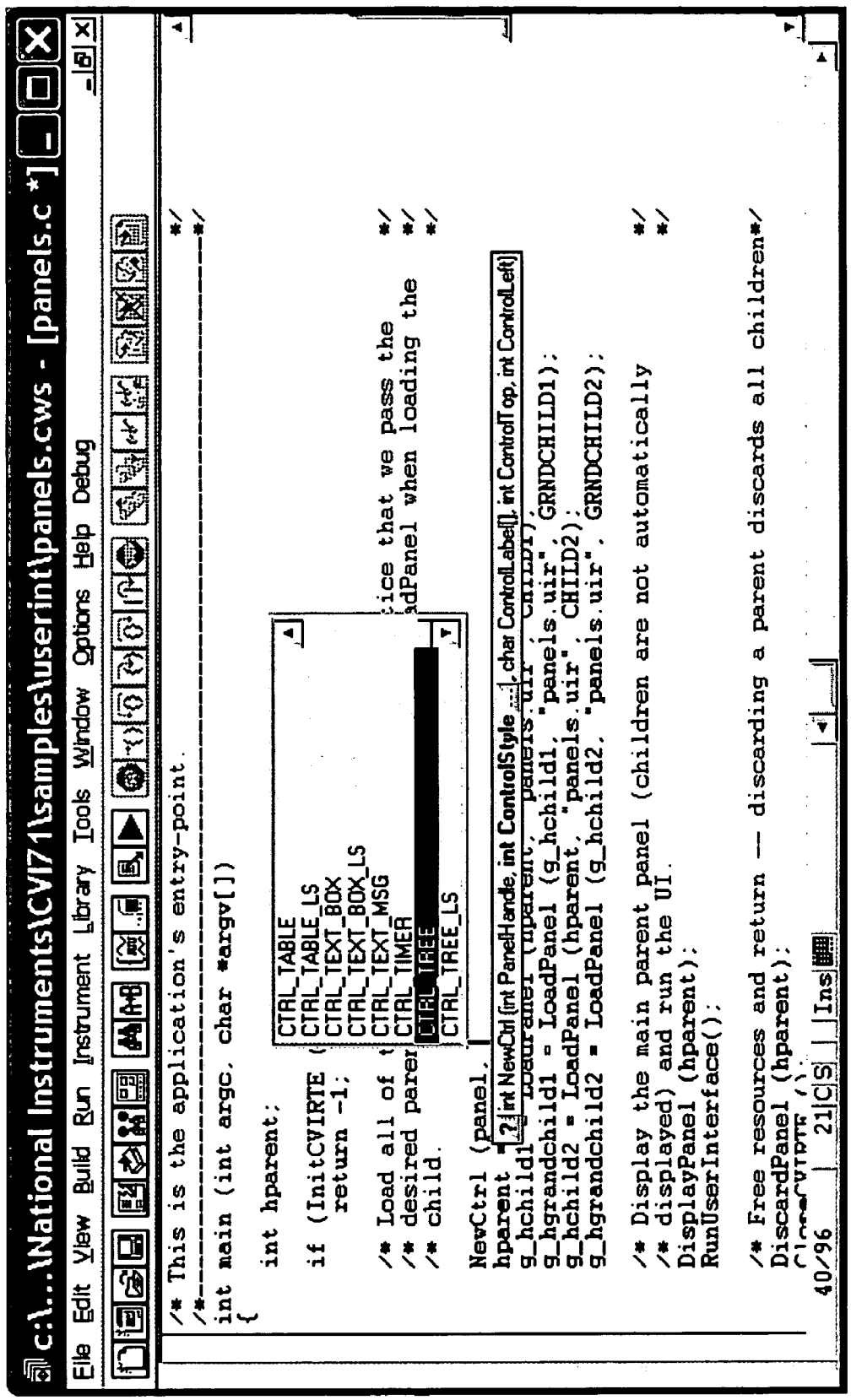
FIG. 8 illustrates another example of a parameter assistant user interface that is displayed directly within the source code window for the user's program.

FIG. 8 illustrates another example of a parameter assistant user interface that is displayed directly within the source code window for the user's program, i.e., not in a separate window. In this example, the user has invoked a parameter assistant user interface for the "ControlStyle" parameter of the "NewCtrl" function by clicking the ellipsis button displayed after the "ControlStyle" parameter in the displayed prototype tip. The selectable list of control styles pops up as shown in FIG. 8. Each control style corresponds to a numeric constant. The user can select one of these constants to cause it to be inserted as the parameter value for the "ControlStyle" parameter in the "NewCtrl" function call. For example, FIG. 9 illustrates the user's source code after he has selected the "CTRL_TREE" item from the list and dismissed the parameter assistant user interface.

Figure 10:
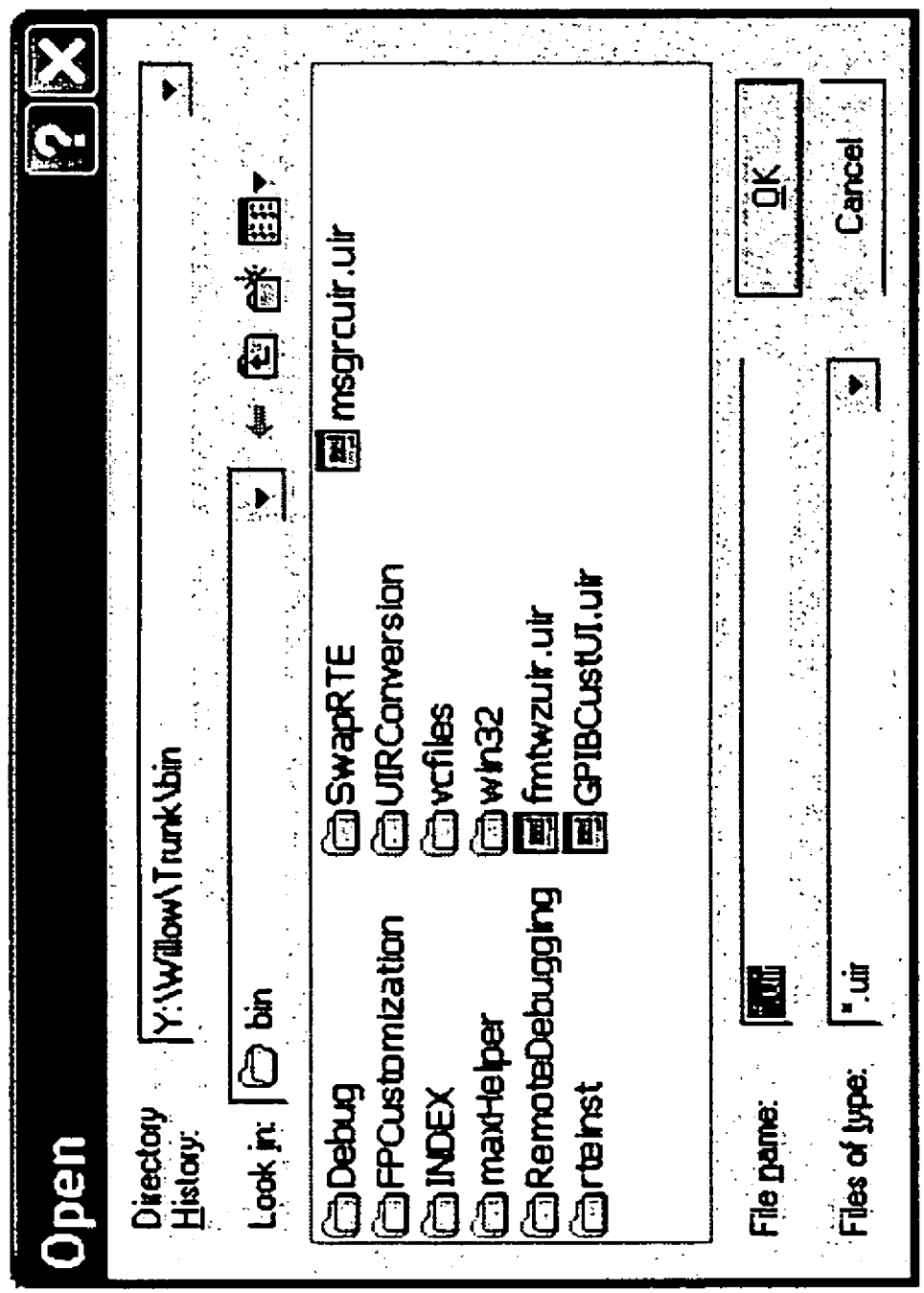
FIG. 10 illustrates an exemplary parameter assistant user interface with which the user may interact to browse to and select a file.

As another example, if the parameter P represents a file name then the parameter assistant user interface for the parameter P may be operable to display a file dialog that allows the user to browse through the computer system's directory structure and select a desired file name to pass to the function F. For example, FIG. 5 illustrates a program in which the user has placed the cursor of the source code window on a function call to a "LoadPanel" function. As shown, the ADE has detected that the user is editing or viewing the "LoadPanel" function call and has displayed a prototype tip showing the user the function's prototype. As shown, the second parameter of the "LoadPanel" function is named "Filename", and an ellipsis button for invoking a parameter assistant user interface for the "Filename" parameter is displayed in the prototype tip. The user may click this button to cause the parameter assistant user interface shown in FIG. 10 to be displayed. In this example, the parameter assistant user interface comprises a separate modal dialog with which the user may interact to browse to and select a file. The name of the file selected by the user may then be inserted as the parameter value for the "Filename" parameter in the "LoadPanel" function call, replacing the existing parameter value.

Figure 11:
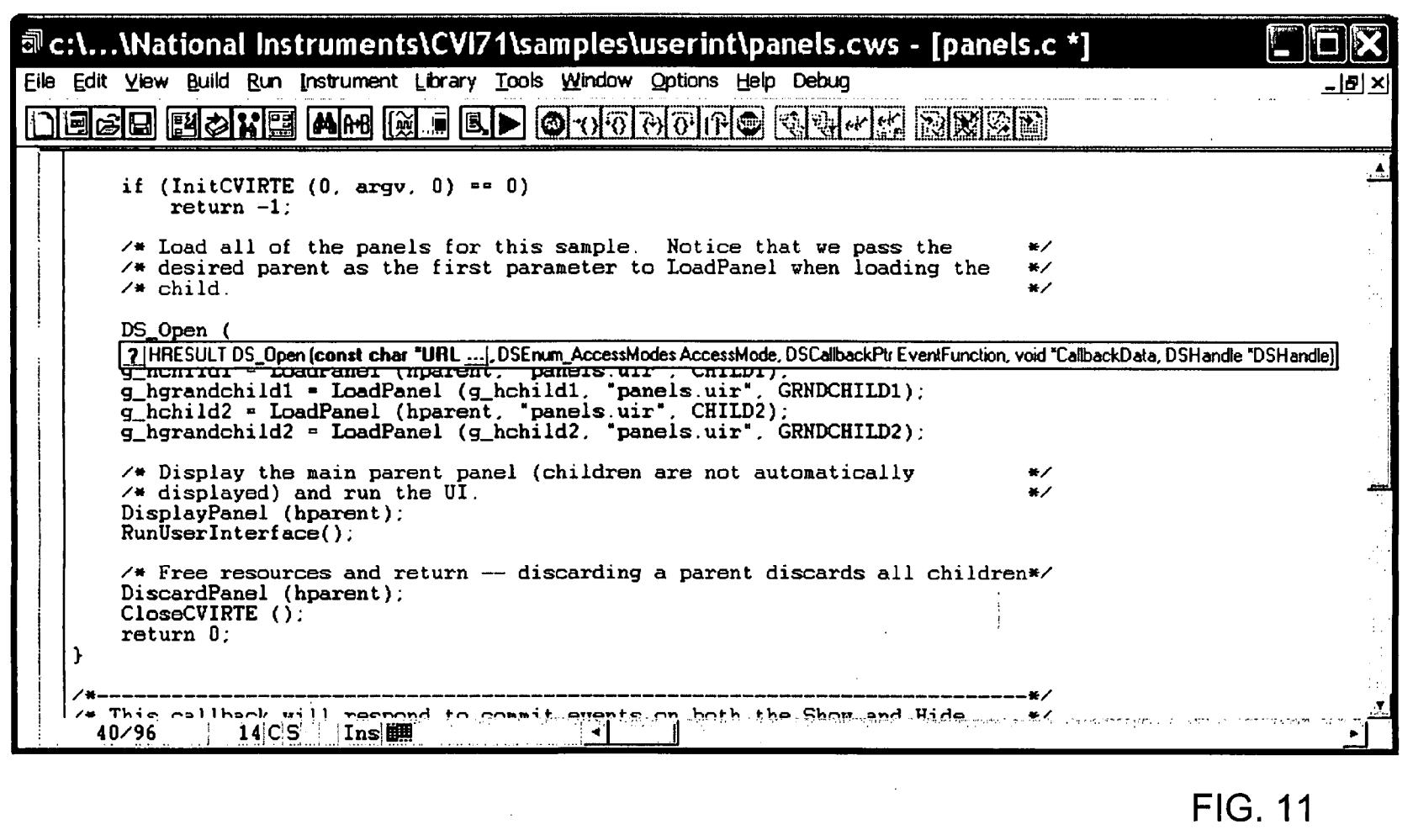
Figure 12:
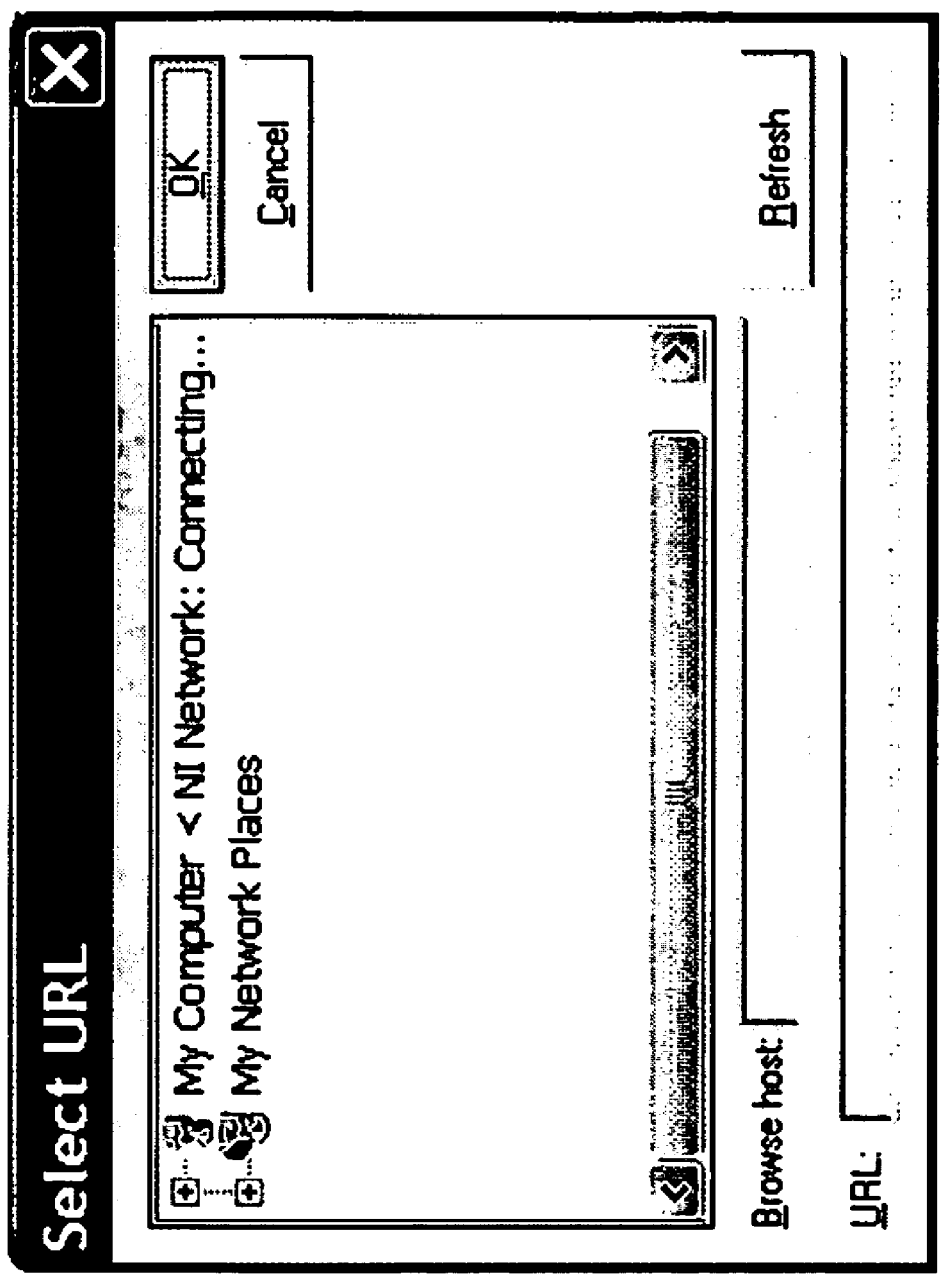
FIG. 12 illustrates an exemplary parameter assistant user interface with which the user may interact to browse to and select a uniform resource locator (URL)

As another example, if the parameter P represents a uniform resource locator (URL) then the parameter assistant user interface for the parameter P may be operable to display a user interface that allows the user to browse for and select a desired URL to pass to the function F. For example, FIG. 11 illustrates a program in which the user is currently creating a function call to a "DS_Open" function. As shown, the ADE has detected that the user is creating the "DS_Open" function call and has displayed a prototype tip showing the user the function's prototype. As shown, the first parameter of the function is named "URL", and an ellipsis button for invoking a parameter assistant user interface for the "URL" parameter is displayed in the prototype tip. The user may click this button to cause the parameter assistant user interface shown in FIG. 12 to be displayed. In this example, the parameter assistant user interface comprises a separate modal dialog with which the user may interact to browse to and select a URL. The URL selected by the user may then be inserted as the parameter value for the "URL" parameter in the "DS_Open" function call, as described above.

Thus, in various embodiments the parameter assistant user interface for the parameter P may have any kind of appearance, may allow the user to select any kind of parameter value, and may perform any function to aid or guide the user in selecting a parameter value, depending on the purpose or type of the parameter P.

In one embodiment the functionality of the parameter assistant user interface may vary depending on dynamically determined conditions, or the parameter values presented to the user by the parameter assistant user interface may be dynamically determined. As one example, the parameter assistant user interface may be operable to dynamically determine a set of valid parameter values for the parameter P based on current conditions, such as the current state or configuration of the computer system, the current configuration of devices coupled to the computer system, the current state of data stored in a file on the computer system, etc.

For example, consider an instrument driver function which takes a string parameter indicating a device command. The instrument driver function may be written so that it can control a plurality of different types of devices. However, the set of valid commands may be different for different types of devices. Thus, although the instrument driver function may be passed any command from the entire set of possible commands, only a subset of those commands may actually be applicable or valid for the user's computer system, depending on what type of device is actually connected to the user's computer system. Thus, the parameter assistant user interface may be operable to dynamically query the device actually connected to the user's computer system to determine its type and may then intelligently limit the choices presented to the user so that only the string commands that are valid for the user's particular device can be selected. This may simplify the task of selecting a valid parameter value and may help the user create an error-free program.

In one embodiment, the parameter assistant user interface for the parameter P may be operable to dynamically determine a set of valid values for the parameter P based on source code in the user's program. As one example, the parameter assistant user interface may determine the set of valid values for the parameter P based on the values of other parameters in the function call to the function F. For example, some functions are written so that the meaning of a given parameter depends on the value of a previous parameter.

For example, FIG. 13 illustrates a program in which the user is currently creating a function call to a "SetCtrlAttribute" function. The third parameter of this function is named "ControlAttribute", as indicated by the displayed prototype tip. The "ControlAttribute" parameter specifies the particular control attribute to be set by the function call. The parameter(s) after the third parameter represents the value to which to set the attribute. The valid attribute values can vary, depending on which control attribute is specified by the "ControlAttribute" parameter.

Figure 14:
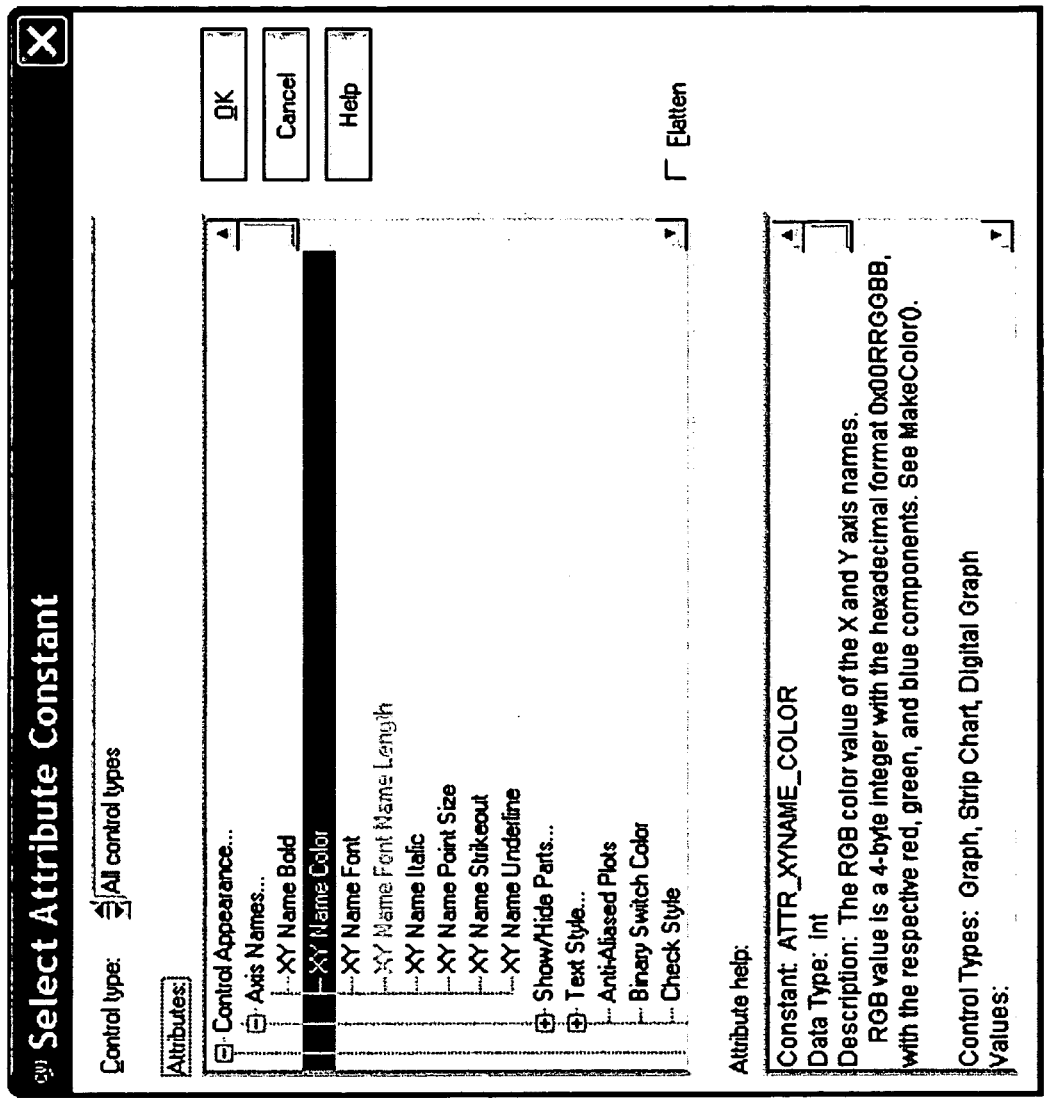
FIG. 14 illustrates an exemplary parameter assistant user interface in which a set of possible control attributes is hierarchically organized as a tree.

As shown in FIG. 13, the cursor is currently located at the position of the "ControlAttribute" parameter in the function call, causing an ellipsis button for invoking a parameter assistant user interface for this parameter to be displayed. The user can click this button to display the parameter assistant user interface shown in FIG. 14. In this example, the set of possible control attributes is hierarchically organized as a tree in the parameter assistant user interface. The user can expand and collapse categories as desired to browse to and select the desired control attribute to set. The "Attribute Help" box at the bottom of the parameter assistant user interface displays help text for the control attribute that is currently highlighted in the tree.

Figure 15:
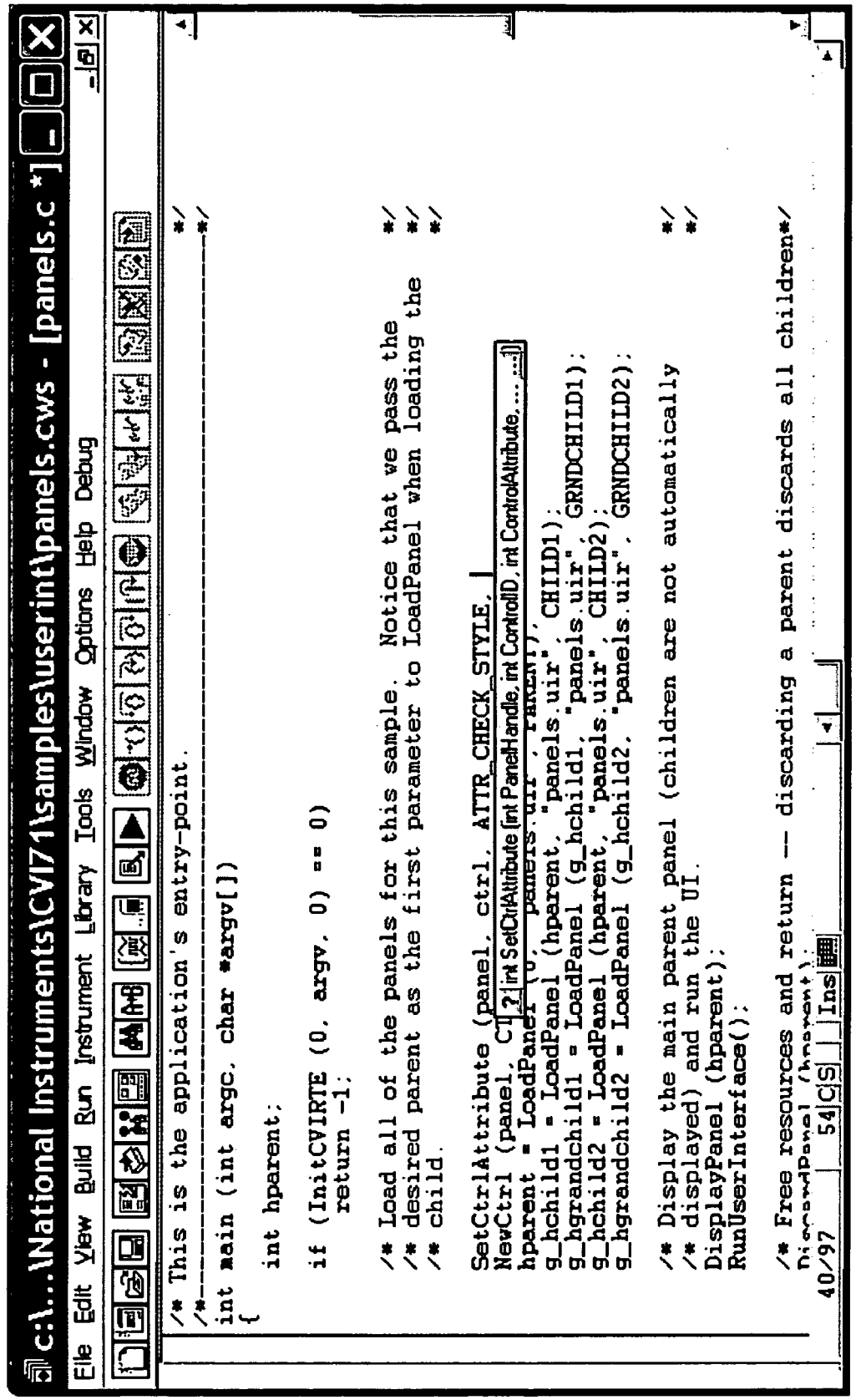
FIG. 15 illustrates the user's program after he has used the parameter assistant user interface of FIG. 14 to select a control attribute for the "SetCtrlAttribute" function call.

FIG. 15 illustrates the user's program after he has used the parameter assistant user interface to select a "ATTR_CHECK_STYLE" attribute. This attribute configures the visual style of check icons displayed in a list control. After the "ATTR_CHECK_STYLE" constant has been inserted as the "ControlAttribute" parameter in the function call, the cursor is currently located at the position of the fourth parameter in the function call. As noted above, the valid values for the fourth parameter can vary, depending on the value of the "ControlAttribute" parameter. A parameter assistant user interface for the fourth parameter may be operable to dynamically determine the set of valid values for the fourth parameter based on the actual value of the "ControlAttribute" parameter. For example, in this case the parameter assistant user interface may be operable to determine that the function call is configured with a value of "ATTR_CHECK_STYLE" as the "ControlAttribute" parameter and may thus present the user with only those attribute values that apply to the "ATTR_CHECK_STYLE" attribute.

Figure 16:
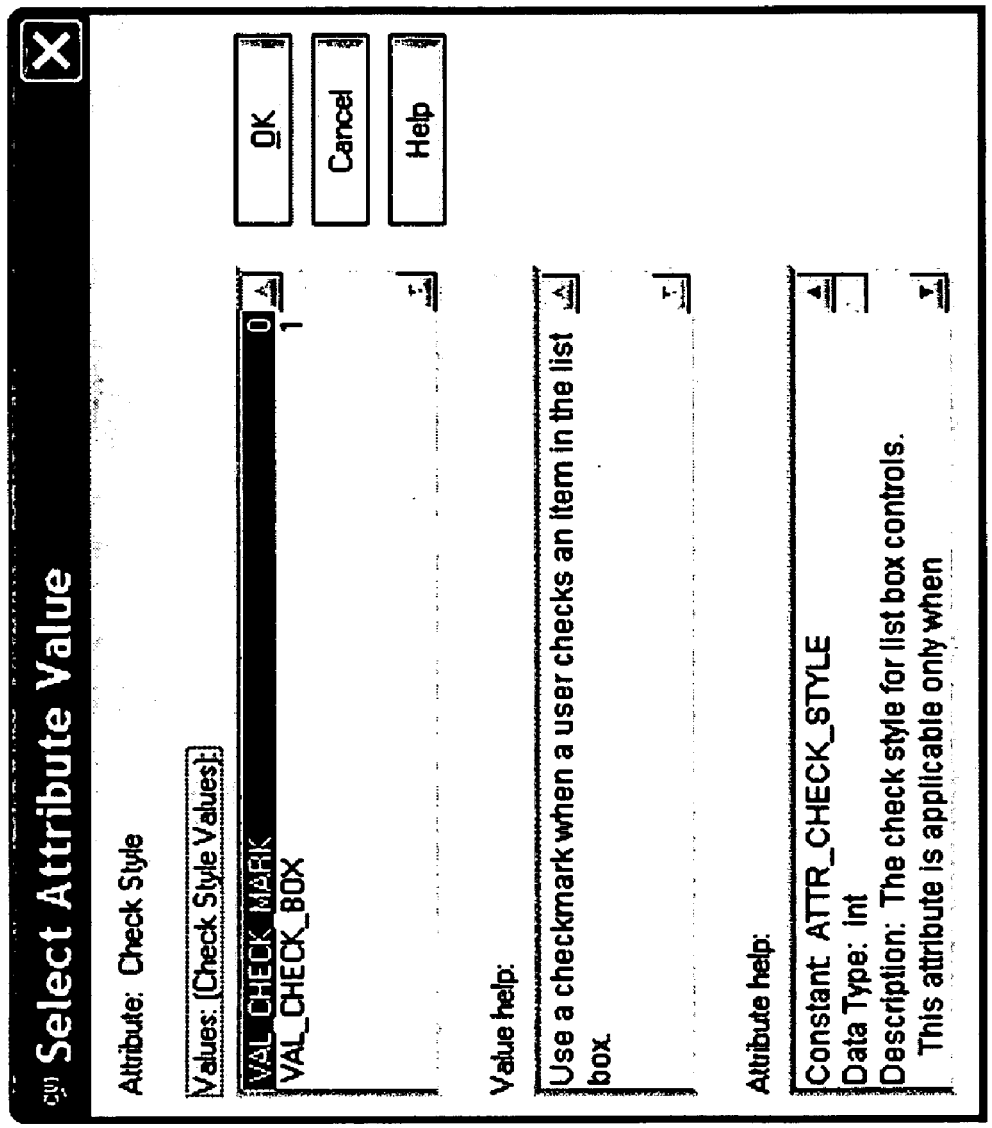
FIG. 16 illustrates an exemplary parameter assistant user interface for selecting a value for the fourth parameter of the "SetCtrlAttribute" function call.

The user can click the ellipsis button displayed at the fourth parameter position to display the parameter assistant user interface for the fourth parameter. (Note that in this function prototype, parameters after the third parameter are represented in C language notation as " . . . " to indicate that they can vary.) FIG. 16 illustrates a parameter assistant user interface for selecting a value for the fourth parameter. In this example, the parameter assistant user interface has limited the set of attribute values which the user may choose from to the values "VAL_CHECK_MARK" and "VAL_CHECK_BOX", which are the only values that apply to the "ATTR_CHECK_STYLE" attribute. If the user had chosen an attribute other than "ATTR_CHECK_STYLE" as the "ControlAttribute" parameter then the parameter assistant user interface for the fourth parameter would have displayed a different set of attribute values instead of those shown in FIG. 16.

Referring again to FIG. 4, in 409 the parameter value which the user selects using the parameter assistant user interface may be inserted for the parameter P into the function call to the function F in the source code of the user's program as described above, e.g., may be inserted once the user closes the parameter assistant user interface. For example, if the parameter assistant user interface presents a dialog allowing the user to select a file name for the parameter P as described above with reference to FIG. 10 then the file name selected by the user may be inserted into the user's program. More specifically, the file name may be inserted as the parameter P in the source code in the function call which the user is currently editing.

In another embodiment, the function call may already be configured with a parameter value for the parameter P when the parameter assistant user interface is launched. In this case the ADE may be operable to replace the existing parameter value with the new parameter value selected by the user in the parameter assistant user interface. For example, the parameter P may represent a file name, and the function call to function F may already be configured with a value of "abc.txt" for the parameter P. If the user then invokes the parameter assistant user interface and browses to and selects a new file named "def.txt" then the ADE may replace "abc.txt" with "def.txt" as the value for parameter P.

In one embodiment, functionality for displaying parameter assistant user interfaces for various function parameters may be built in to the ADE. For example, the ADE may provide various function libraries that are installed on the user's computer system when the ADE is installed. The ADE may be operable to display parameter assistant user interfaces for various parameters of functions in the standard function libraries.

In one embodiment the ADE may also allow third-party software developers to create a library of functions wherein one or more parameters of one or more of the functions in the library have associated parameter assistant user interfaces. For example, the ADE may provide a framework allowing a third-party developer to customize various function parameters so that they have a parameter assistant user interface for aiding end users in selecting a parameter value. When end users write a function call in their program for a function with a parameter that has been customized by the third-party developer, the ADE may display a button for invoking the parameter assistant user interface for the customized parameter, as described above with reference to FIG. 4.

As one example, a vendor of a hardware instrument may utilize the ADE to create a library of instrument driver functions to control or interact with the hardware instrument. For one or more of the instrument driver functions, the vendor may customize a parameter (or multiple parameters) of the function so that the parameter has an associated parameter assistant user interface. End users who utilize the vendor's hardware instrument may install the library of instrument driver functions on their computer systems and create programs that utilize the instrument driver functions. When an end user writes a function call for a function that has a customized parameter, the ADE may display a button for the customized parameter and allow the user to invoke the parameter assistant user interface for the customized parameter by clicking the button as described above.

Figure 17:
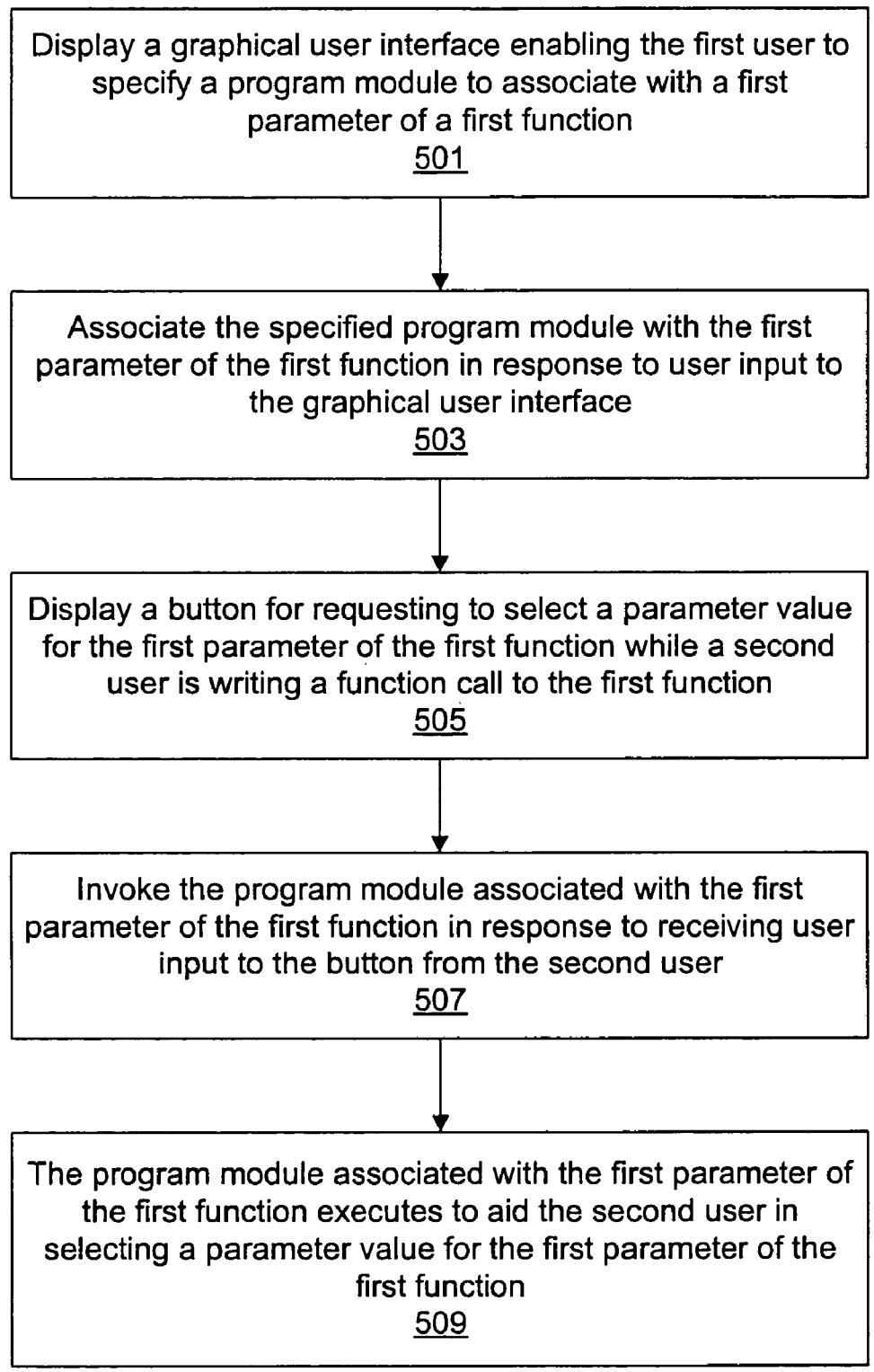
FIG. 17 is a flowchart diagram illustrating one embodiment of a method for enabling a first user (e.g., a third-party software developer or vendor) to customize a function parameter so that it has an associated parameter assistant user interface.

FIG. 17 is a flowchart diagram illustrating one embodiment of a method for enabling a first user (e.g., a third-party software developer or vendor) to customize a function parameter so that it has an associated parameter assistant user interface as described above. It is noted that FIG. 17 illustrates a representative embodiment, and alternative embodiments are contemplated.

In 501 the ADE may display a graphical user interface enabling the first user (e.g., a third-party software developer or vendor) to specify a program module to associate with a first parameter of a first function. For example, the graphical user interface may include fields for specifying the first function, the first parameter, and the program module. The program module may comprise a portion of code that can be invoked for execution. In various embodiments the program module may comprise a software module or component or a software routine of any kind. For example, in one embodiment the program module may comprise a function in a DLL. In another embodiment the program module may comprise a software component such as an ActiveX component, a .NET component, a Java component, etc. One embodiment of a graphical user interface for associating DLL functions with function parameters is described below.

In 503 the ADE may receive user input from the first user to the graphical user interface, where the user input specifies a program module to associate with the first parameter of the first function, and the ADE may associate the specified program module with the first parameter of the first function in response. For example, associating the program module with the first parameter of the first function may comprise storing data in one or more files or databases to indicate that the program module is associated with the first parameter of the first function.

As described below, the program module that is associated with the first parameter of the first function may implement a parameter assistant user interface that is executable to aid a second user (e.g., an end user who includes a function call to the first function in a program) in selecting or specifying a parameter value for the first parameter of the first function. The program module may be written by the first user and may be operable to perform any functionality to aid end users in selecting a parameter value for the first parameter of the first function, e.g., depending on the meaning of the first parameter.

It is noted that in other embodiments the ADE may allow a program module to be associated with the first parameter of the first function without receiving user input from the first user via the graphical user interface. For example, the first user may input data to one or more files or databases to specify that the program module is associated with the first parameter of the first function instead of interacting with a graphical user interface.

Once the program module has been associated with the first parameter of the first function, the ADE may be operable to invoke the program module to aid a second user in selecting or specifying a parameter value for the first parameter of the first function. The second user may be an end user who writes a function call to the first function in his program. For example, while writing or viewing the function call to the first function, the second user may provide input to the ADE requesting to select a parameter value for the first parameter of the first function, and the ADE may invoke the program module in response to the user input. In one embodiment the program module may be installed on the second user's computer system (e.g., may be installed along with a library including the first function) so that the program module is present and able to execute on the second user's computer system.

In one embodiment the second user may request to select a parameter value for the first parameter of the first function by clicking a button associated with the first parameter of the first function, similarly as described above with reference to FIG. 4. For example, as indicated in 505, the ADE may be operable to display a button for requesting to select a parameter value for the first parameter of the first function while the second user is writing a function call to the first function. For example, for each parameter in the active function call (i.e., the function call where the cursor is located in the second user's program), or at least for the active parameter in the active function call, the ADE may check whether a program module has been associated with the parameter, and if so, may display a button that the second user can click to request to select a value for the parameter. In one embodiment the button(s) may be displayed within a prototype tip showing the prototype of the function, as described above.

In 507 the ADE may invoke the program module associated with the first parameter of the first function in response to receiving user input to the button from the second user. In other embodiments the ADE may invoke the program module in response to other kinds of user input from the second user, such as selecting a menu item or pressing a hotkey combination.

As indicated in 509, the program module associated with the first parameter of the first function may execute to aid the second user in selecting or specifying a parameter value for the first parameter of the first function. For example the program module may implement a parameter assistant user interface operable to display a graphical user interface allowing the user to select a parameter value for the first parameter. The program module may be operable to perform any functionality in aiding the second user in selecting a parameter value. For example, in one embodiment the program module may be operable to dynamically determine a set of valid values for the first parameter of the first function and may limit the second user's choices to only the valid values, as described above with reference to FIG. 4.

Thus the second user may interact with a graphical user interface displayed by the program module to select or specify a parameter value for the first parameter of the first function. The program module may inform the ADE of the parameter value that was selected by the second user so that the ADE can automatically insert the parameter value in the function call to the first function in the second user's program. In one embodiment the ADE may define a programming interface to which program modules associated with parameters need to conform. Conforming to this programming interface may enable a program module to interface with the ADE as necessary when the program module is invoked to aid a user in selecting a parameter value. For example, each program module may be required to return a value, e.g., a string, indicating the parameter value that was selected by the user, so that the ADE can then insert the parameter value into the source code of the user's program. In another embodiment, the program module may call a function or method provided by the ADE to inform the ADE of the selected parameter value instead of returning the parameter value as a return value. The ADE may also provide information to the program module, e.g., by passing in parameters to the program module when it is invoked. For example, the ADE may pass in the current parameter value (if any) already in the user's source code for the function call, so that the program module's graphical user interface can indicate that the function call is currently configured with that parameter value.

Figure 18:
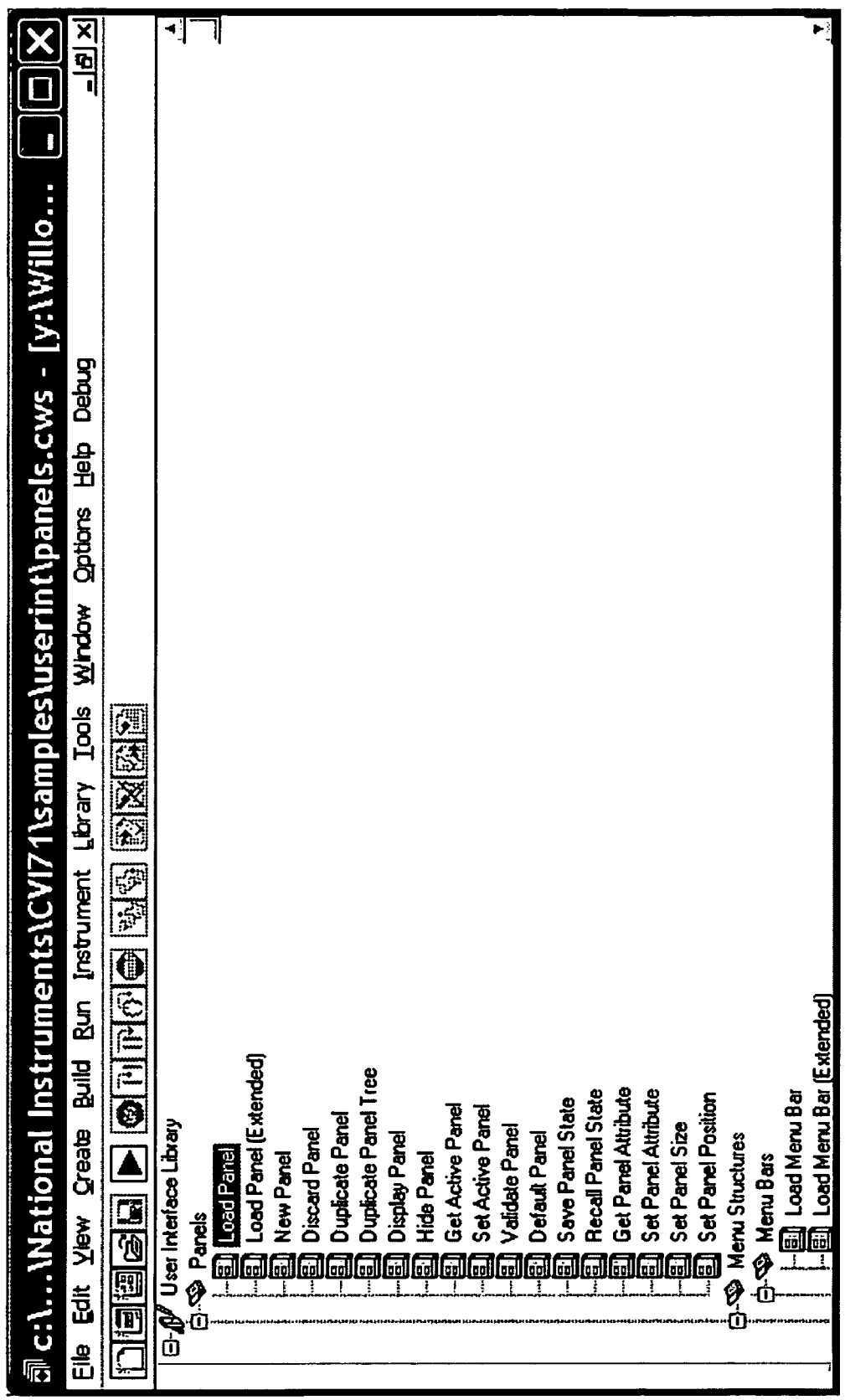
FIGS. 18-20 illustrate an exemplary graphical user interface of an ADE that allows a first user (e.g., a third-party software developer or vendor) to associate a callback function in a DLL with a function parameter.
Figure 19:
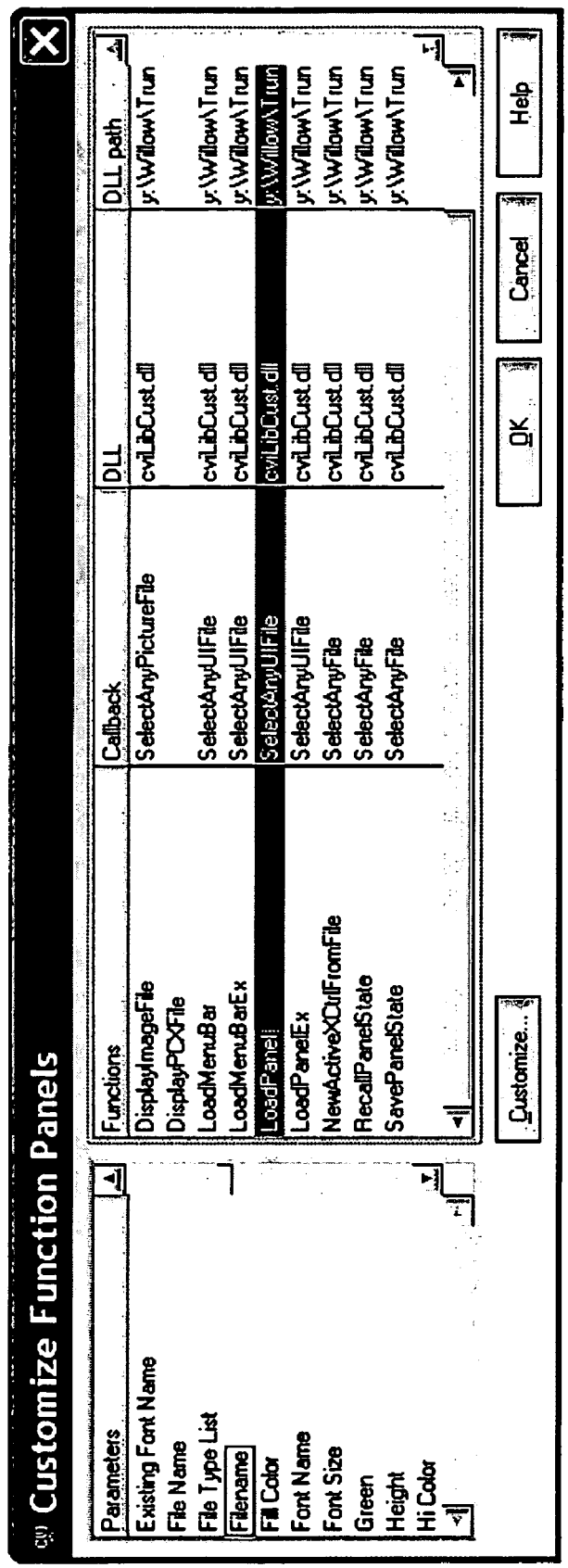
Figure 20:
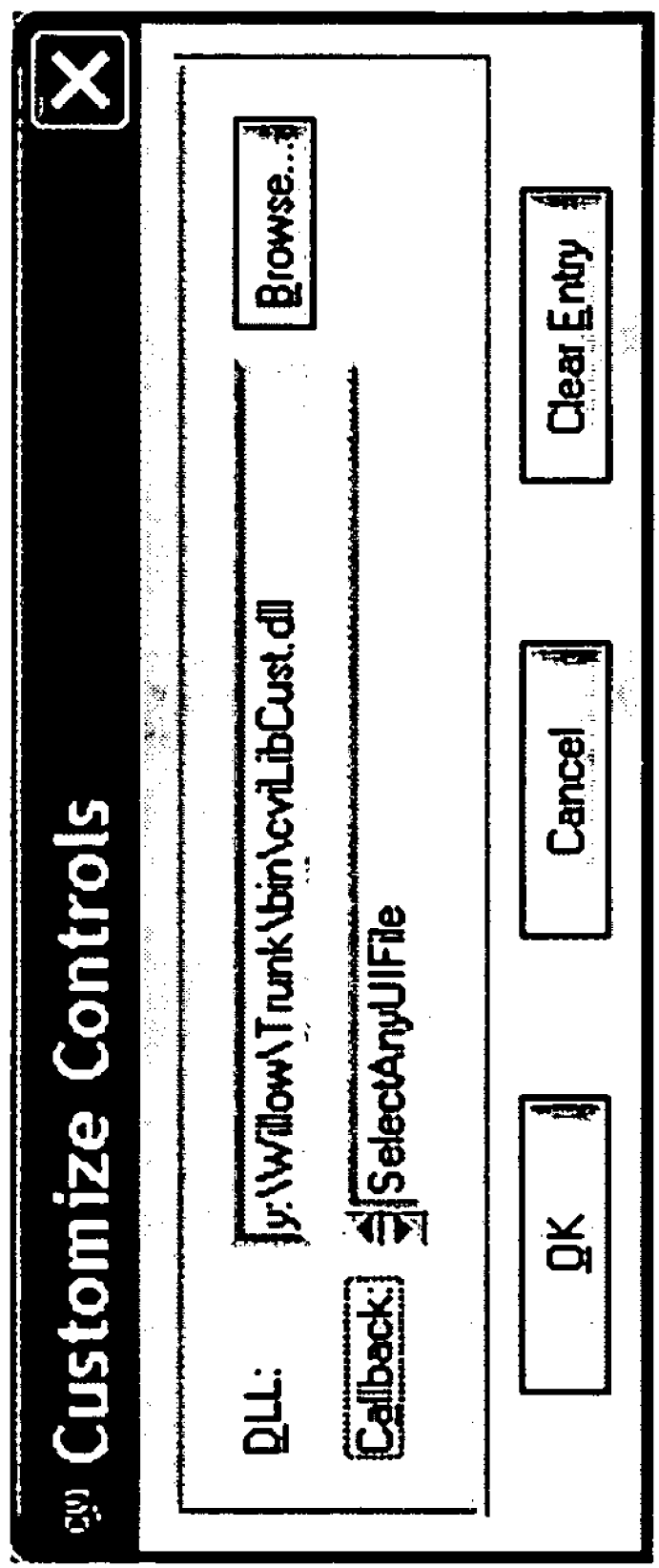

FIGS. 18-20 illustrate an exemplary graphical user interface of an ADE that allows a first user (e.g., a third-party software developer or vendor) to associate a program module (in this embodiment a function in a DLL) with a function parameter.

FIG. 18 is an exemplary screen shot illustrating a library of functions. In this example, the library comprises a plurality of user interface functions. The user interface functions are organized hierarchically according to what kind of user interface objects they relate to. For example, functions dealing with user interface panels are grouped together under a "Panels" sub-tree, functions dealing with menu bars are grouped together under a "Menu Bars" sub-tree, etc.

In one embodiment the developer of the library may be able to customize parameters of functions in the library by associating an appropriate program module or portion of program code with each parameter he desires to customize. In one embodiment the ADE may provide a graphical user interface allowing the user to easily customize parameters in this manner. For example, FIG. 19 illustrates one exemplary user interface dialog for customizing parameters of functions of the user interface function library illustrated in FIG. 18, which the developer may invoke by selecting an option from the "Tools" menu of the window of FIG. 18. An alphabetical list of all parameter names of all functions in the library is displayed in the "Parameters" list box on the left. The developer may select a parameter name in the list to display all the functions that have that parameter name in their prototypes. The names of the functions that have a parameter of the selected parameter name are displayed in the list box on the right under the "Functions" heading. For example, in FIG. 19, the developer has selected the "Filename" parameter name in the "Parameters" list box. In response, the ADE displays all the functions in the library that have a parameter named "Filename". As shown, nine functions are listed, i.e., "DisplayImageFile", "DisplayPCXFile", "LoadMenuBar", etc.

The developer may then select a function listed in the list box on the right, and may click the "Customize . . . " button to invoke a user interface dialog for customizing the selected parameter in the selected function. FIG. 20 illustrates one exemplary user interface dialog for customizing the parameter. In this example, the developer first selected the "Filename" parameter from the parameter list, then selected the "LoadPanel" function from the function list, as shown in FIG. 19, and then clicked the "Customize . . . " button to cause the user interface dialog of FIG. 20 to be displayed.

In the illustrated embodiment, the developer can customize a parameter by associating a callback function in a DLL with the parameter. The associated callback function may be called when a user clicks the ellipsis button beside the parameter in the function's tooltip prototype while editing a function call for the function in the user's source code, as described above. The callback function may be operable to implement a parameter assistant user interface for the parameter. For example, the callback function may execute to present the user with a graphical user interface that aids the user in selecting a parameter value, as described above. The user interface dialog of FIG. 20 includes a "DLL" control that allows the developer to select the DLL file that contains the desired callback function. Selecting a DLL file causes the "Callback" control to be populated with a list of all the callback functions in the DLL file. The developer may then select the desired callback function to associate with the parameter using the "Callback" control.

As shown in the example of FIG. 20, the developer has selected a callback function named "SelectAnyUIFile" from a DLL file named "cviLibCust.dll". Thus, clicking the "OK" button causes the SelectAnyUIFile( ) callback function to be associated with the "Filename" parameter in the "LoadPanel" function. The association of a callback function with a parameter in a function causes an ellipsis button to appear beside the parameter in the prototype tip that is displayed when a user edits a function call for that function in the source code for his program. As described above, clicking the ellipsis button may cause the associated callback function to be executed to display a parameter assistant user interface. The callback function may execute to perform any appropriate action to aid the user in specifying a value for the parameter in the function call he is currently editing. Thus, in this example, the SelectAnyUIFile( ) callback function may be invoked whenever a user clicks the ellipsis button that is displayed beside the "Filename" parameter in the prototype tip when the user is creating or editing a "LoadPanel;" function call in the source code for his program, and the SelectAnyUIFile( ) callback function may execute to display a file dialog allowing the user to browse to and select a file name to pass to the "LoadPanel" function.

Referring again to FIG. 19, in addition to the "Functions" heading, the list box on the right also includes "Callback", "DLL", and "DLL Path" headings. For each function, the entry under the "Callback" heading specifies the callback function (if any) that has previously been associated with the selected parameter for the function, the "DLL" heading specifies the name of the DLL file that includes the callback function, and the "DLL Path" specifies the path to the DLL file. For example, as illustrated in FIG. 19, the "Filename" parameter for the "DisplayImageFile" function has been customized so that the "SelectAnyPictureFile" callback function from the "cviLibCust.dll" DLL is associated with it. As another example, no callback function is listed for the "DisplayPCXFile" function, indicating that the "Filename" parameter has not been customized for this function.

In one embodiment the callback may be executable to dynamically customize the parameter assistant user interface presented to the user. For example the callback may dynamically determine a list of valid parameter values for a given parameter, e.g., based on the current configuration of the computer system, based on a data file stored on the computer system, etc. As one example, the callback may query an instrument to find out the device type or its configuration or capabilities so that the list of parameter values presented to the user can be dynamically customized as appropriate for the particular type of device connected to the computer system or as appropriate for the device's current configuration. Thus, for any given parameter for any given function, the developer may create a callback or program module operable to intelligently aid users in selecting valid or applicable parameter values to pass to function calls for that function.

In another embodiment, the ADE may be operable to automatically implement a parameter assistant user interface for certain parameters in function libraries created by third-party software developers, without requiring the third-party developers to explicitly associate a callback function or other program module with the parameters. For example, in one embodiment the ADE may enable developers to create a function panel file that defines a library of functions. For each function, the developer may create a user interface panel, referred to as a function panel, that includes user interface controls corresponding to each parameter. When developing a program, the user may cause the function panel for a given function to be displayed and may interact with the user interface controls to create a function call for that function. Some types of controls that may be present on a function panel allow the user to select a value from a fixed set of values. For example, ring controls, list boxes, and binary switches all allow the user to select a value from a fixed set of values.

In one embodiment, the ADE may be operable to automatically display a parameter assistant user interface for each parameter represented by a ring control (or other control that allows a value to be selected from a fixed set of values). For example, the parameter assistant user interface that is automatically displayed may simply display a user interface dialog with a selectable list of the ring control's values. Thus, suppose for example that a function F created by a third-party software developer has a parameter P, and suppose that the function panel for the function F utilizes a ring control to represent the parameter P, where the ring control is configured with N string values. As described above, when a user creates a function call in his program's source code to the function F (or positions the cursor on an existing function call to function F), the ADE may be operable to display a prototype tip in the program window, where the prototype tip visually indicates the function prototype for function F. In this case, the ADE may also display an ellipsis button in the tooltip beside the parameter P, indicating that a parameter assistant user interface is available to aid the user in selecting a parameter value for the parameter P. When the user clicks this ellipsis button, the ADE may be operable to display a parameter assistant user interface with a selectable list of the N string values. The user may then select one of the N string values to cause the selected string to be inserted as the value for parameter P in the function call to function F.

Thus, in this example the ADE may be operable to automatically display a parameter assistant user interface for the parameter P, even though no custom callback was defined for or explicitly associated with the parameter P. The ADE may simply recognize that the parameter P is represented in the function panel for the function F as a ring control and may automatically display a parameter assistant user interface allowing the user to select one of the ring control's values when the user clicks the ellipsis button for the parameter P.

In various embodiments the ADE may be operable to automatically display any of various kinds of parameter assistant user interfaces for various function parameters, without requiring callback functions or other program modules to be written to implement the parameter assistant user interfaces. Developers may simply create a library of functions and may possibly create or specify additional information regarding the functions in the library, e.g., by creating function panels as described in the above example. For various types of parameters in the functions, the ADE may be operable to automatically display parameter assistant user interfaces, similarly as described above for parameters represented by function panel ring controls.

Another embodiment of the ADE may have features for increasing the user's ease and efficiency of viewing help text related to a function or method call. According to one embodiment, the ADE may be operable to display a prototype tip for a function in the source code window when the user is currently creating or editing a function call to that function, similarly as described above. In one embodiment the prototype tip may include a button or other input area which the user may click to cause help text for the function and/or help text for one or more parameters of the function to be displayed.

Figure 21:
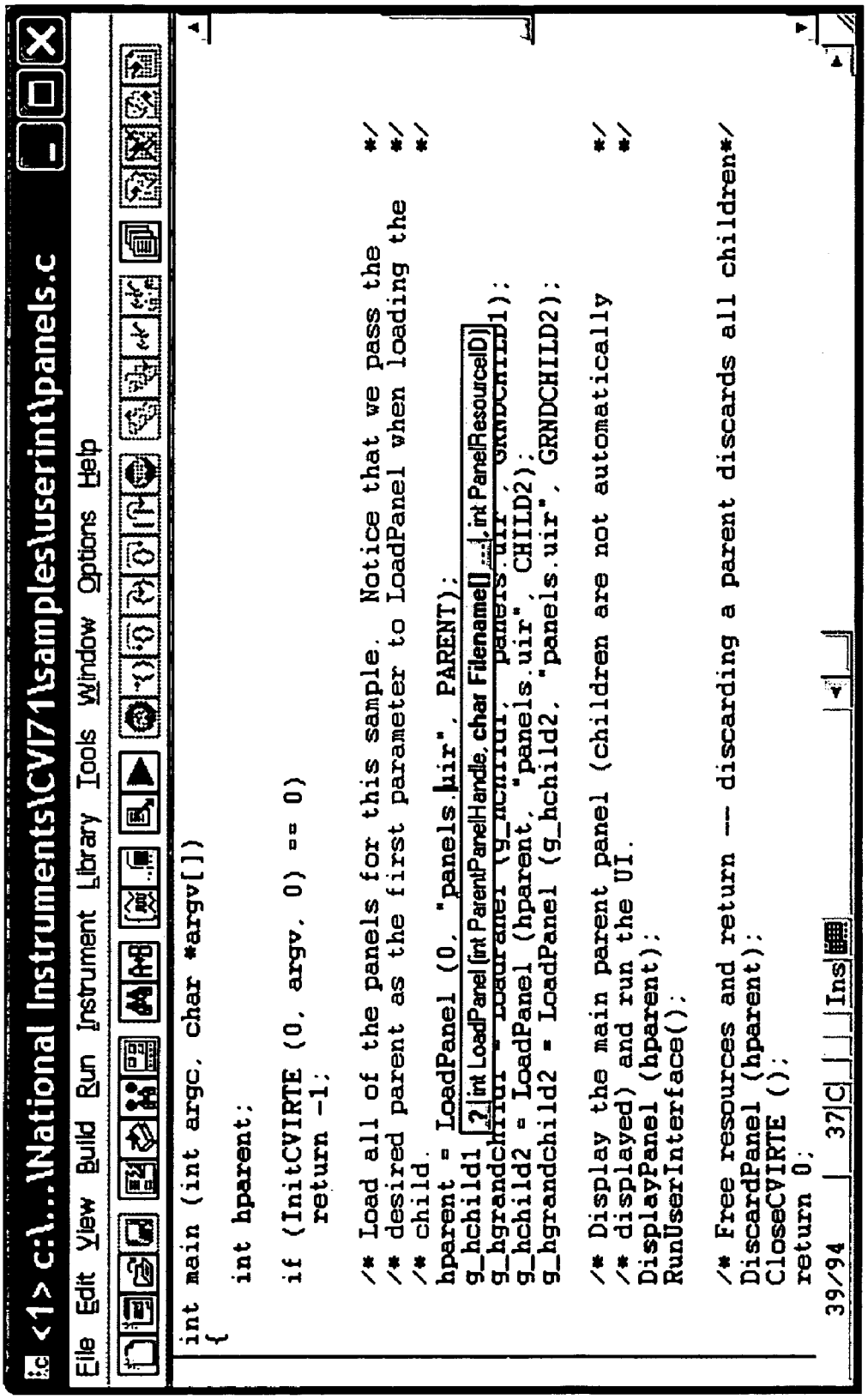
FIG. 21 illustrates a program in which a prototype tip for a "LoadPanel" function is currently displayed.

For example, in FIG. 21 the source code window cursor is currently located at the position of the "Filename" parameter of a "LoadPanel" function call. As shown, a prototype tip for the "LoadPanel" function call is displayed, and the "char Filename" parameter of the prototype tip is highlighted with bold text to indicate that it is the active parameter (i.e., the parameter where the cursor is currently located). In this embodiment a button labeled with a question mark "?" is displayed at the beginning of the prototype tip. The user can click this button to request help text for the active parameter to be displayed. In another embodiment, the user may press a hotkey keystroke or keystroke combination to request the help text for the active parameter to be displayed. For example, in one embodiment the user may press the "F1" key to display the help text for the active parameter.

Figure 22:
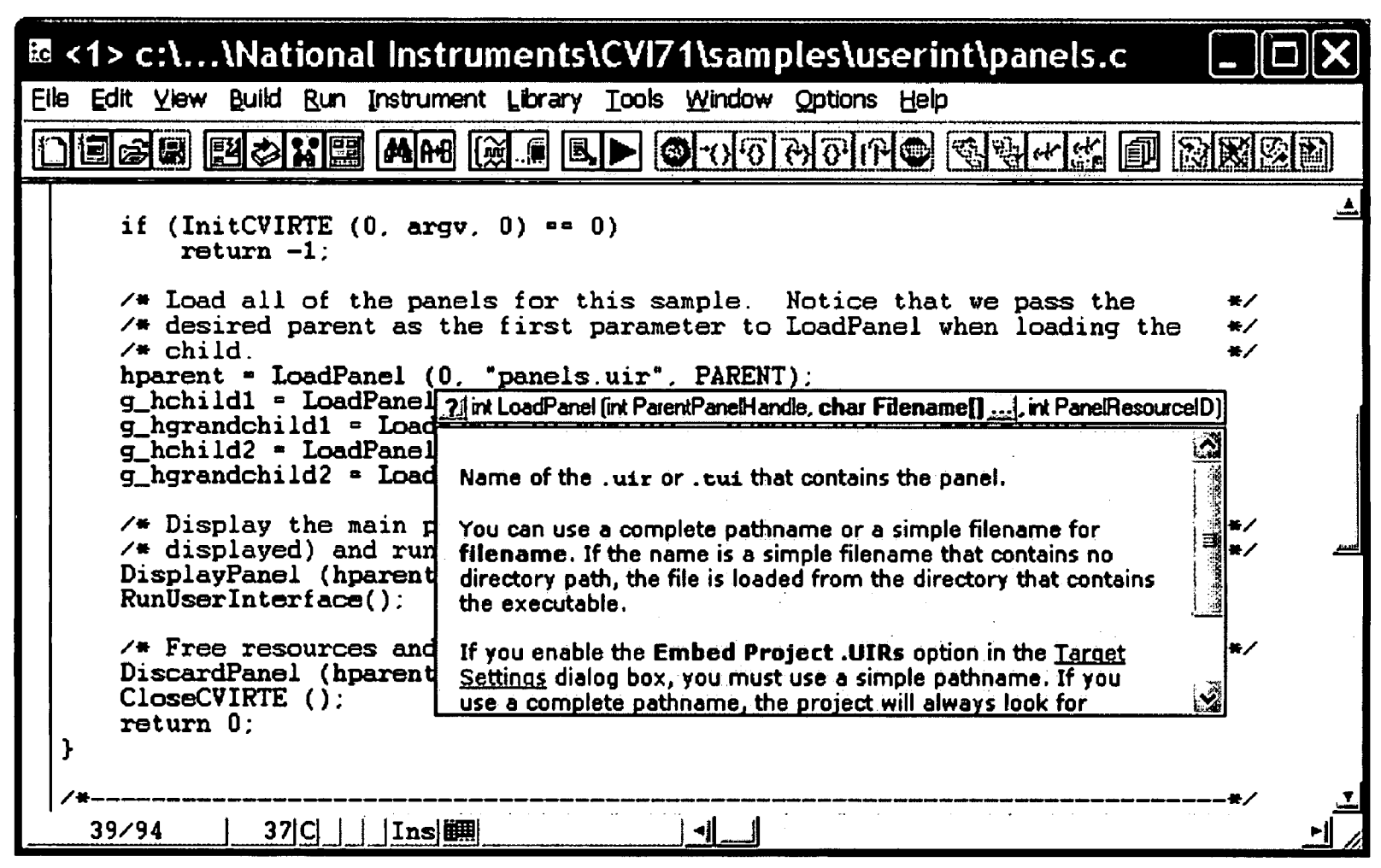

In one embodiment the help text that is displayed in response to the user's request may appear in or appear overlayed on the source code window. In one embodiment, a scrollable text box is displayed within or displayed overlayed on the source code window. The help text may be displayed in the text box, and the user may scroll through the text box to view the help text, e.g., by operating scroll arrows of the text box with a mouse device or pressing up and down keys on the keyboard. The text box may be displayed in a convenient location near the current function call. The text box may also appear to be integrated within the source code window. For example, it may not appear in a separate modal dialog or in a separate window. This may allow the user to easily view the help text without shifting his gaze significantly from the point in the source code which he was viewing when he invoked the help text and without being distracted by a separate dialog or window. For example, in FIG. 22 the user has invoked a text box displaying help for the "Filename" parameter of the "LoadPanel" function, which is the active parameter in the source code window, as described above with reference to FIG. 21. As shown, the prototype tip and the text box appear directly below the active "LoadPanel" function call, allowing the user to view the help text for the active parameter in a convenient and intuitive location and in a manner such that the help text appears overlayed directly on the source code window.

Creating a text-based program typically involves writing many different function or method calls. While writing function calls, users often need to refer to help text for the function. An ADE which is able to streamline the process of invoking and viewing help text and make these actions a more integrated part of the program creation process may significantly increase the user's ease and efficiency of writing a program.

Figure 23:
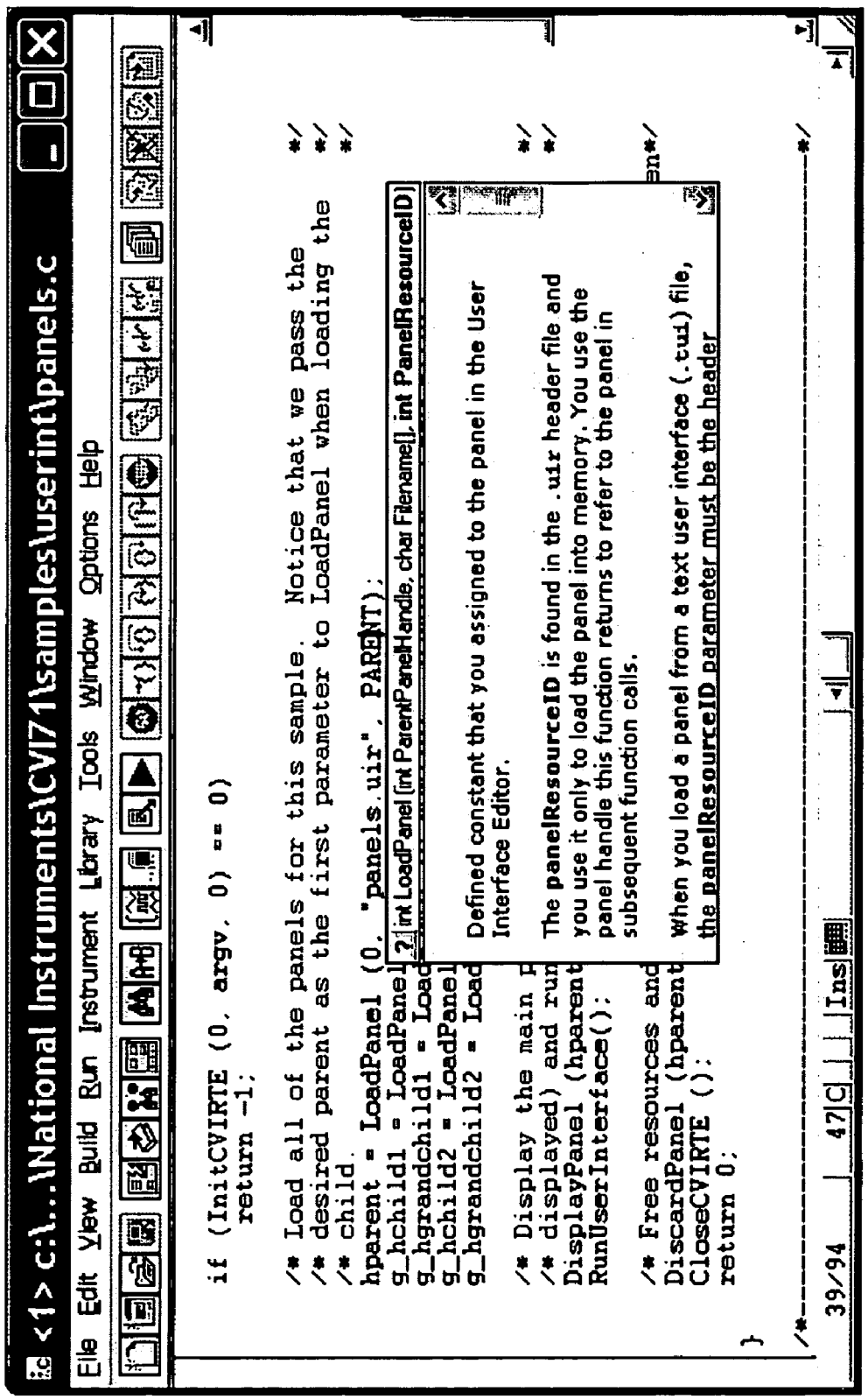
FIG. 23 illustrates the program of FIG. 22 after the user has moved the cursor to change the active parameter.

If the user then moves the cursor to make a different parameter the active parameter, the parameter name of the new active parameter may be highlighted in the prototype tip. For example, in FIG. 23 the user has scrolled the cursor to the right so that it is over the text "PARENT", which is passed as the value for the "PanelResourceID" parameter of the "Load-Panel" function. Thus, the "PanelResourceID" parameter in the prototype tip is now highlighted with bold text instead of the "Filename" parameter, to indicate that the "PanelResourceID" parameter is now the active parameter.

If help text is currently displayed when the user moves the cursor to a new active parameter, the help text may automatically be replaced with that of the new active parameter. For example, in FIG. 23 the help text in the text box has automatically changed to the help text for the "PanelResourceID" parameter in response to the user moving the cursor to the "PanelResourceID" parameter position, replacing the help text for the "Filename" parameter that was previously displayed. Thus, the user may conveniently view help text for any desired parameter in the function simply by scrolling or moving the cursor to different parameter positions within the function call. Being able to change which help text is currently displayed in this manner may significantly aid the user in quickly viewing the particular portion of help text in which he is interested.

Figure 24:
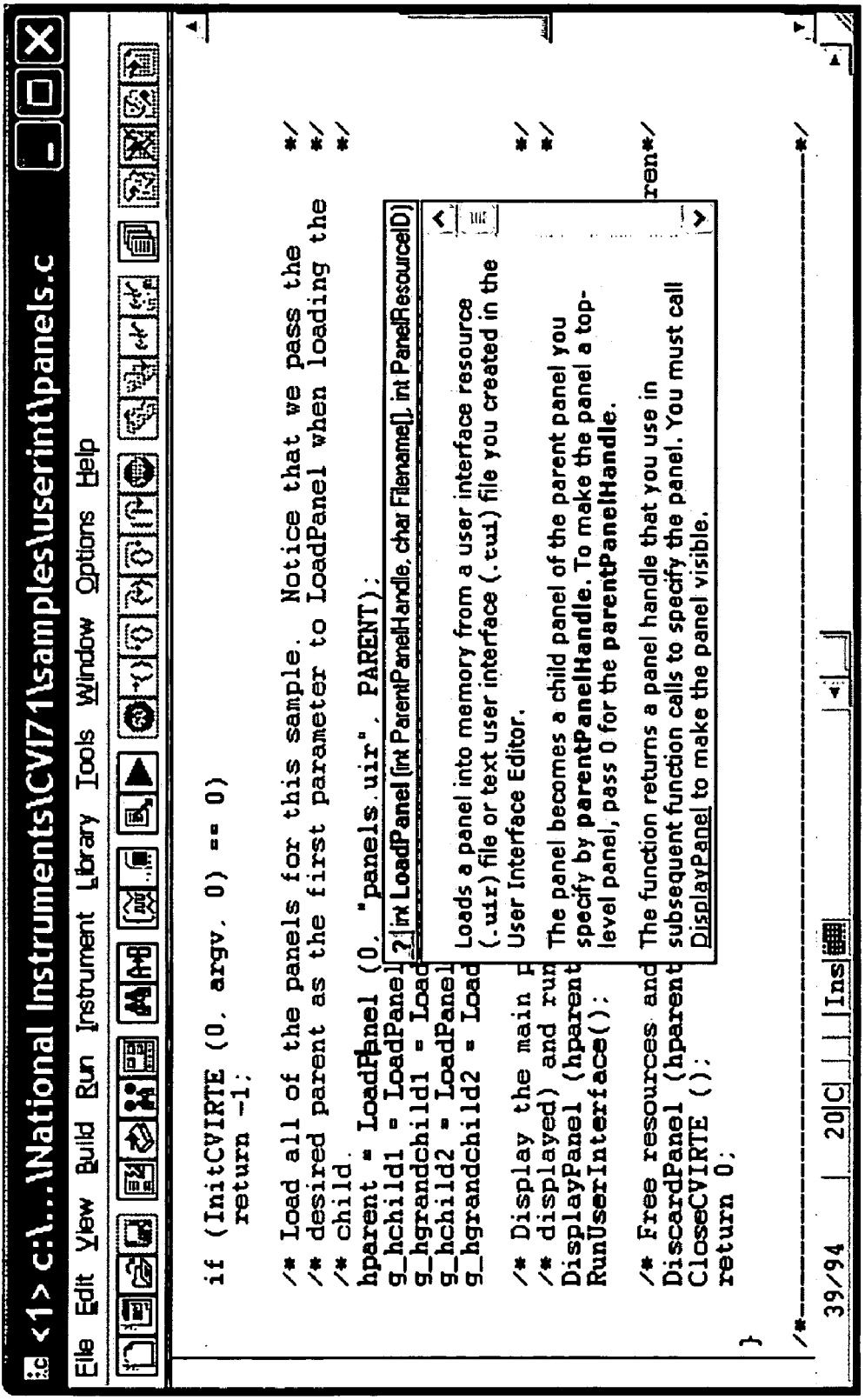
FIG. 24 illustrates the program of FIG. 23 after the user has moved the cursor over the "LoadPanel" function name.
Figure 25:
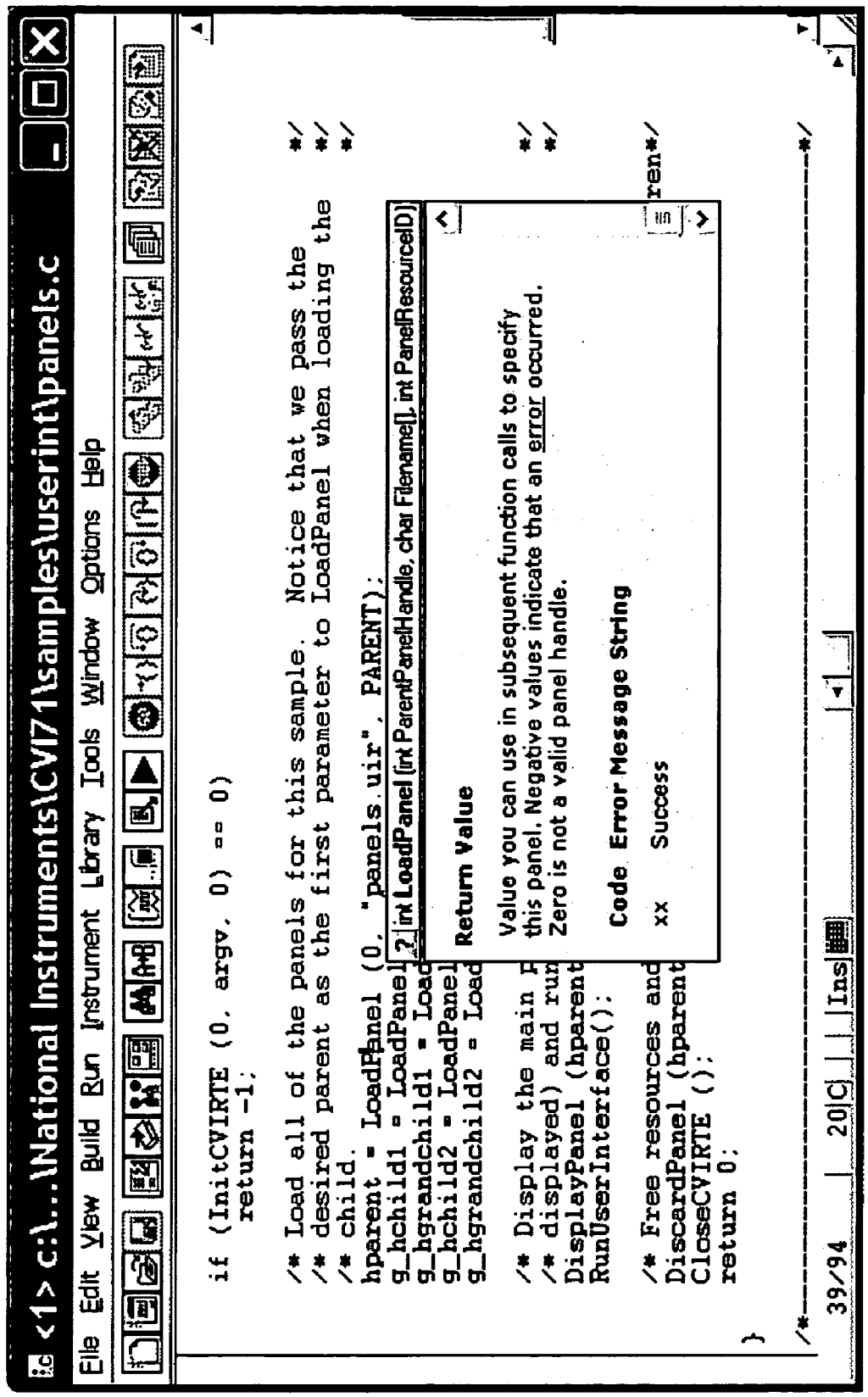
FIG. 25 illustrates the program of FIG. 24 after the user has scrolled the help text for the "LoadPanel" function to the end to view help text related to the function's return value.

Similarly, if the user scrolls or moves the cursor to the function name, then the function name may be highlighted, e.g., by making it bold, and the help text that was previously displayed may be replaced by help text for the function itself. For example, in FIG. 24 the user has moved the cursor over the "LoadPanel" function name, causing help text explaining the operation of the "LoadPanel" function to be displayed in the text box. In one embodiment, if the function has a return value then help text for the return value may also be displayed. For example, the return value help text may be appended after the help text for the function itself. In FIG. 25 the user has scrolled the help text for the "LoadPanel" function to the end to view help text related to the function's return value.

At any time, the user may easily dismiss the help text, e.g., by pressing an "Escape" key or other keystroke, or clicking in an area of the source code window away from the function call.

In some prior ADE's the user could cause help text related to a function to be displayed, but it would not be displayed such that it appeared to be integrated with or overlayed on the source code window in the manner described above. Instead these prior ADE's typically displayed the help text in a manner that can be distracting to the user, e.g., by launching a separate window or modal dialog to display the help text.

Also, some prior ADE's did not allow the user to view help text separately for each parameter of a function, but instead displayed all the help text related to the function in a single display, so that the user was forced to look through all the help text to find the portion of interest. For example, if the user was only interested in looking at the help text for one particular parameter of the function, he would have to search through all of the help text for the function to find the portion related to that parameter. In contrast, the ADE of the present disclosure may allow the user to quickly view the exact portion of help text in which he is interested, e.g., may allow the user to directly invoke the help text for the active parameter in the source code window. Furthermore, the ADE of the present disclosure may allow the user to change which parameter's help text is displayed simply by moving the cursor to different parameter positions within the function call. Thus, the user can easily change which help text is displayed without having to issue separate commands to dismiss the help text and re-display different help text and without having to shift his gaze to different locations or different windows.

In many programming languages, variables must first be declared before they can be used. For example, in the C programming language, an integer variable named "intVar" must be declared with a declaration such as, "int intVar;" before the variable can be used in other program statements. One embodiment of the ADE may be operable to increase the user's ease and efficiency of creating variable declarations.

Figure 26:
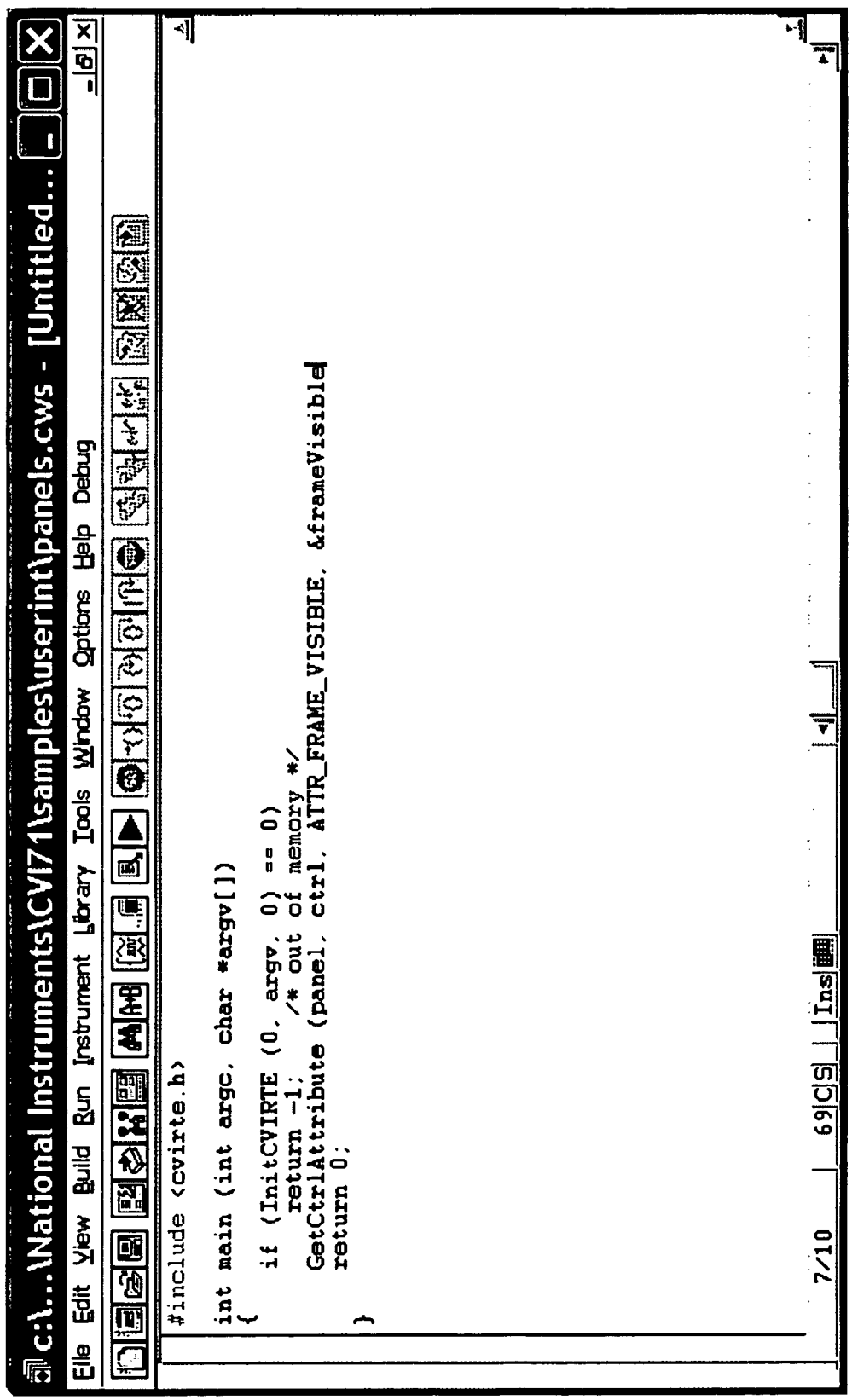
FIG. 26 illustrates a program in which the user is currently creating a function call to a "GetCtrlAttribute" function and has typed an undeclared variable as the value for the fourth parameter of the function.

In one embodiment the ADE may be operable to automatically declare variables which the user passes as parameters in function calls. For example, FIG. 26 illustrates a program in which the user is currently creating a function call to a "GetCtrlAttribute" function. As shown, the user has typed "&frameVisible" as the value for the fourth parameter of the function. However, "frameVisible" must be declared as a variable previously in the program before it can be used in the "GetCtrlAttribute" function call.

In one embodiment the user may press a hotkey keystroke or keystroke combination, may select a menu item from a menu bar or context menu, or may provide other user input indicating a desire for a variable declaration for the "frameVisible" variable to be added to the program. In response, the ADE may automatically determine an appropriate location for the variable declaration and may automatically insert source code at that location to declare the variable. In an embodiment in which the programming language utilizes program blocks, such as the C language for example, the variable declaration may be inserted at or near the beginning of the current program block, i.e., at or near the beginning of the block where the cursor is currently located. For example, in FIG. 27, the line "int frameVisible;" has been automatically inserted at the beginning of the current block, i.e., the main program block in this example.

In one embodiment the location of the cursor may not change when variable declarations are automatically inserted in this manner. This may enable the user to easily cause the variable declaration for the current variable (i.e., the variable where the cursor is currently located) to be added to the program and continue writing the program. For example, the user may need to create a function call such as, "FunctionName (&var1, &var2, 0)", where "var1" and "var2" have not yet been declared. Thus, the user may first type, "FunctionName (&var1", and may press a hotkey such as "Ctrl+D" to cause a declaration for the "var1" variable to be added to the program. The cursor may remain at the end of the "FunctionName (&var1" line so that the user can then simply continue typing in the function call. For example, the user can continue typing so that the function call appears as "FunctionName (&var1, &var2" and may then press "Ctrl+D" again to cause a declaration for the "var2" variable (i.e., the variable where the cursor is currently located) to be added to the program. The cursor may remain at the end of the "FunctionName (&var1, &var2" line so that the user can then simply continue typing to complete the function call.

Figure 27:
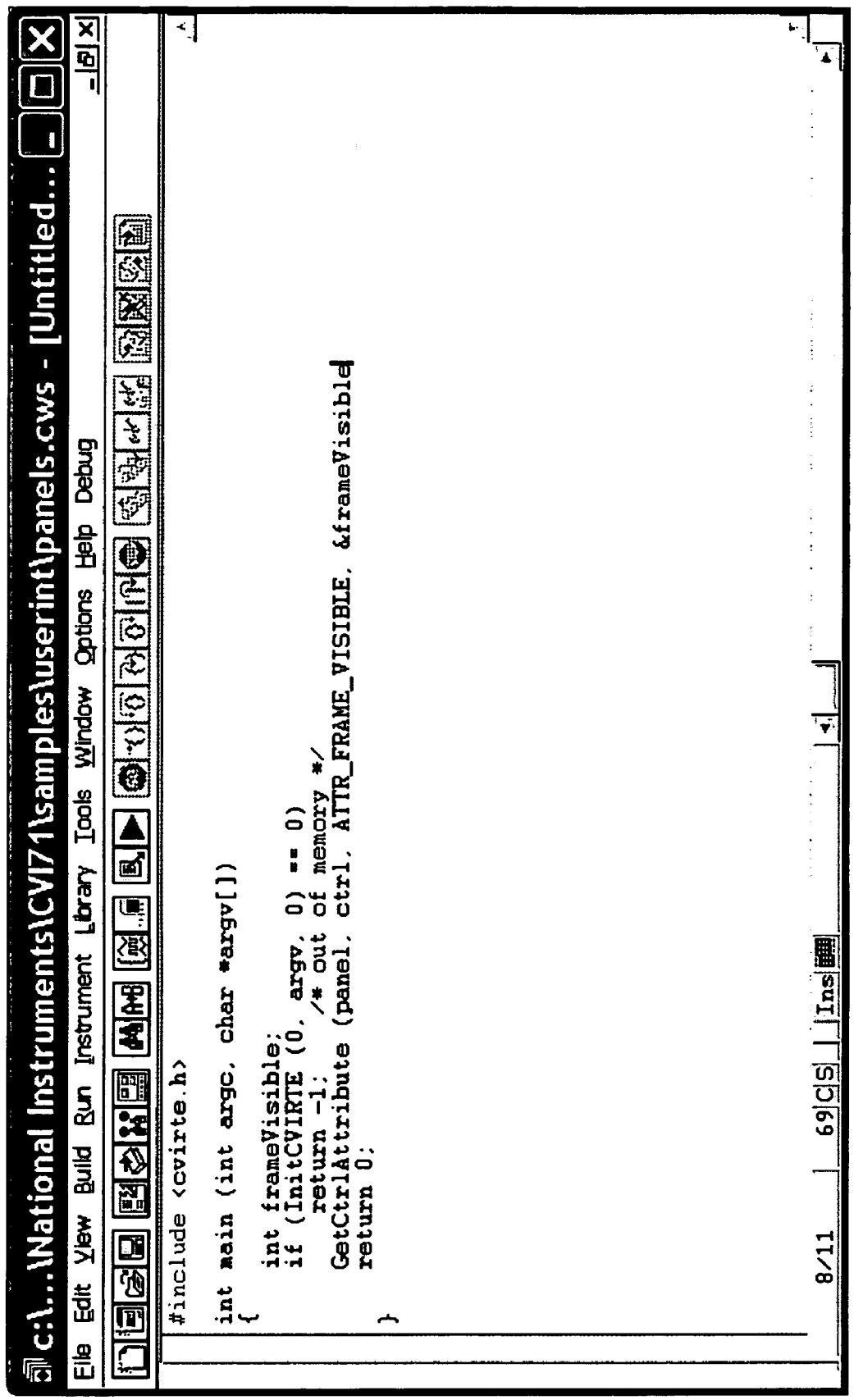
FIG. 27 illustrates the program of FIG. 26 after the ADE has automatically added a variable declaration for the undeclared variable.

The ADE may analyze the function prototype or other information regarding the function to determine the appropriate data type for the variable declaration. Some functions may have parameters whose data type can vary, e.g., based on the actual values of previous parameters. In the program of FIG. 27, for example, the data type of the fourth parameter of the "GetCtrlAttribute" function can vary depending on the value of the third parameter, i.e., depending on which control attribute the function is configured to get. In this case the "GetCtrlAttribute" function is configured to get the "ATTR_FRAME_VISIBLE" attribute value of a control, which is an integer value. Thus, the ADE may be operable to determine the appropriate data type for the "frameVisible" variable based on the fact that the third parameter is "ATTR_FRAME_VISIBLE". If the "GetCtrlAttribute" function were instead configured to get a "ATTR_CONTROL_LABEL" string attribute value, for example, then the ADE may add a declaration to declare a string buffer variable instead of an integer variable.

Some function parameters may have an array data type. If the user requests the ADE to automatically declare a variable for an array parameter, the ADE may prompt the user to specify the number of array elements for the variable declaration. The ADE may then declare the variable so that it has the specified number of array elements.

Figure 28:
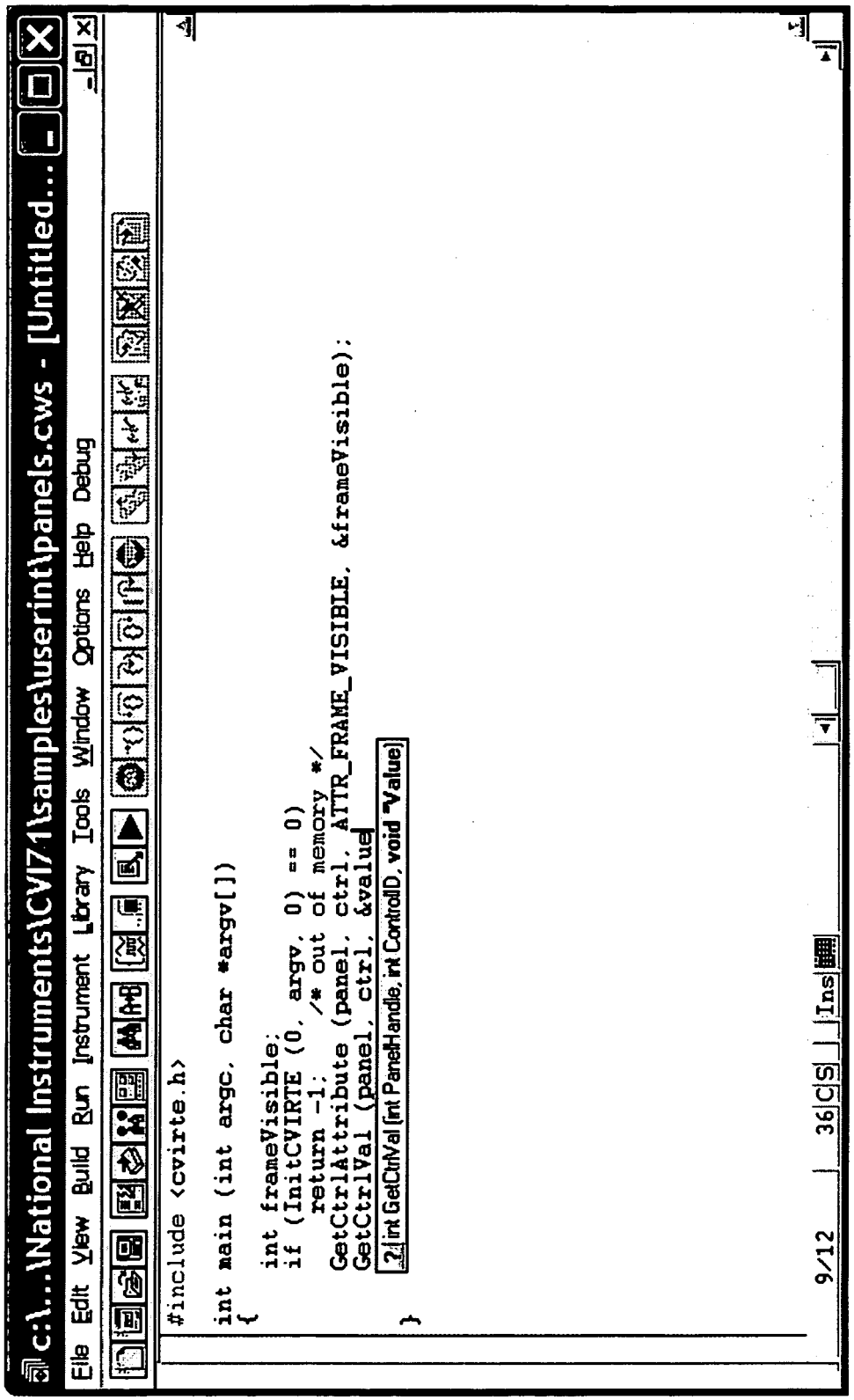
FIG. 28 illustrates a program that includes a function call to a function that has a parameter whose data type can vary.
Figure 29:
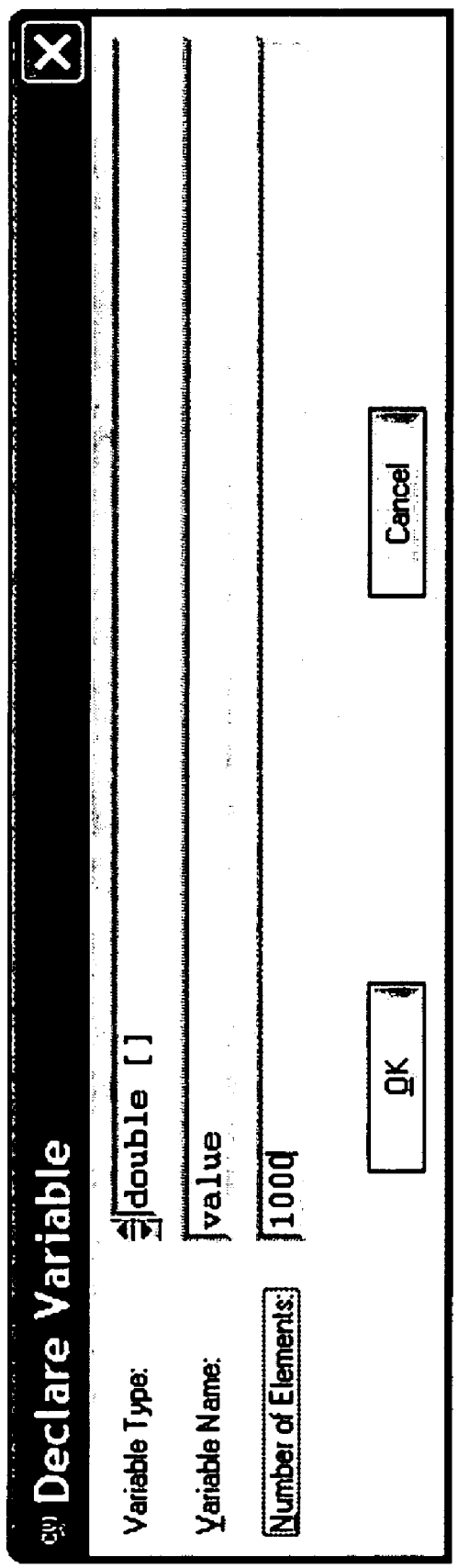
FIG. 29 illustrates a dialog displayed by the ADE to prompt the user to specify the appropriate data type for a variable for which the user has requesting the ADE to insert a declaration.
Figure 30:
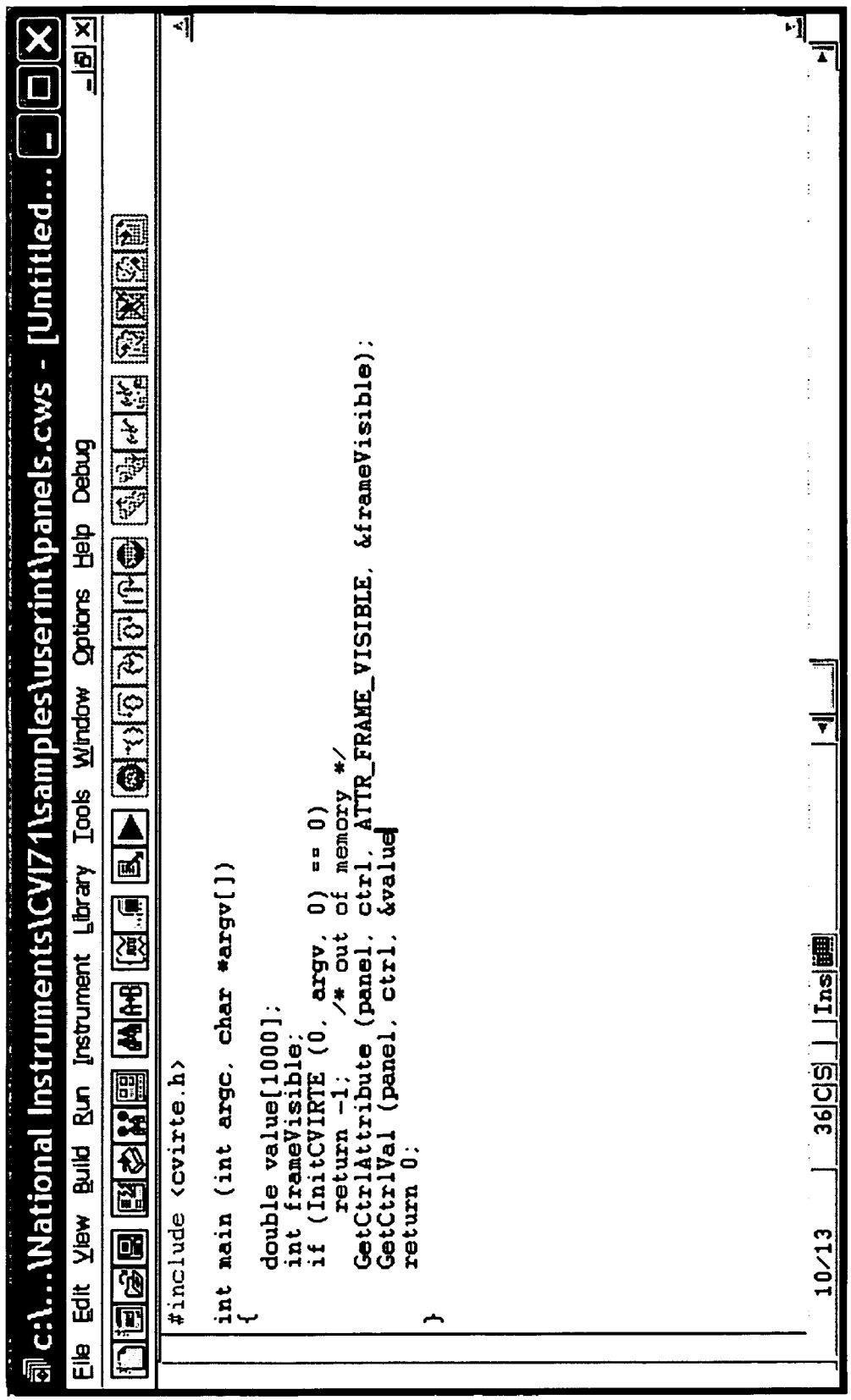
FIG. 30 illustrates the program of FIG. 28 after the ADE has added a declaration for a double array variable having 1000 elements.

If the user attempts to declare a variable for a function parameter whose type can vary and the ADE cannot automatically determine which type the variable should be then the ADE may prompt the user to specify or select the correct data type for the variable. For example, in FIG. 28, the type of the "Value" parameter of the "GetCtrlVal" function can vary depending on the type of control passed to the function. Since the type of the control cannot be automatically determined, the ADE may prompt the user to specify the appropriate data type for the "value" variable in response to the user requesting the ADE to insert a declaration for the "value" variable. For example, the ADE may present the user with a dialog such as shown in FIG. 29. The user may set the "Variable Type" control to the appropriate data type. In this example, the user has set the "Variable Type" control to "double[ ]". Since the "double[ ]" data type is an array type, the ADE may also prompt the user to specify the number of elements for the variable declaration. In this case the user has entered a value of 1000 in the "Number of Elements" field. (The "Number of Elements" field may not be active unless the "Variable Type" control has been set to an array data type.) After the user clicks "OK" the ADE may thus add source code to declare the "value" variable as a double array having 1000 elements, as shown in FIG. 30.

It is noted that various embodiments may further include receiving, sending or storing instructions and/or data implemented in accordance with the foregoing description upon a carrier medium.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-readable memory medium for creating a computer program, the computer-readable memory medium storing program instructions executable to:
   in source code of the computer program, display a first function call written in a programming language that can be compiled into executable code, wherein the first function call takes a first parameter;
   in response to detecting that a cursor is positioned within the first function call, display a GUI element corresponding to the first parameter;
   in response to receiving user input to the GUI element corresponding to the first parameter, display a graphical user interface for selecting a parameter value for the first parameter; and
   in response to user input to the graphical user interface selecting a parameter value for the first parameter, automatically modify the first function call displayed in the source code by inserting the selected parameter value for the first parameter in the first function call, wherein said inserting modifies the source code.

2. The computer-readable memory medium of claim 1, wherein said displaying the GUI element corresponding to the first parameter comprises displaying the GUI element within a source code window for the computer program, wherein the source code is displayed in the source code window.

3. The computer-readable memory medium of claim 1, wherein the first function call is displayed in a source code window for the computer program;
   wherein said displaying the GUI element corresponding to the first parameter comprises displaying the GUI element in the source code window proximal to the first function call.

4. The computer-readable memory medium of claim 1, wherein the program instructions are further executable to:
   display a function prototype for the first function call, wherein the function prototype is formatted according to the programming language;
   wherein said displaying the GUI element corresponding to the first parameter comprises displaying the GUI element within the function prototype for the first function call.

5. The computer-readable memory medium of claim 4, wherein said displaying the function prototype for the first function call comprises displaying the function prototype in a source code window for the computer program, wherein the source code is displayed in the source code window;
   wherein said displaying the GUI element within the function prototype comprises displaying the GUI element within the function prototype in the source code window.

6. The computer-readable memory medium of claim 5, wherein said displaying the function prototype in the source code window comprises displaying the function prototype in the source code window proximal to the first function call;
   wherein the GUI element corresponding to the first parameter is displayed in the source code window proximal to the first function call.

7. The computer-readable memory medium of claim 5, wherein said displaying the function prototype for the first function in the source code window comprises displaying the function prototype with a visual appearance to distinguish the function prototype from the source code of the computer program.

8. The computer-readable memory medium of claim 4, wherein said detecting that the cursor is positioned within the first function call is performed in response to receiving user input requesting function prototype information to be displayed;
   wherein said displaying the function prototype for the first function call comprises displaying the function prototype for the first function call in response to said detecting that the cursor is positioned within the first function call.

9. The computer-readable memory medium of claim 1, wherein said displaying the graphical user interface for selecting a parameter value for the first parameter comprises displaying the graphical user interface embedded directly within a source code window for the computer program, wherein the source code is displayed in the source code window.

10. The computer-readable memory medium of claim 1, wherein said displaying the graphical user interface for selecting a parameter value for the first parameter comprises displaying a user interface dialog for selecting a parameter value for the first parameter.

11. The computer-readable memory medium of claim 1, wherein said displaying the graphical user interface for selecting a parameter value for the first parameter comprises displaying a window for selecting a parameter value for the first parameter.

12. The computer-readable memory medium of claim 1, wherein the first parameter has a set of possible parameter values;
   wherein the graphical user interface displays the set of possible parameter values;
   wherein the user input to the graphical user interface selecting the parameter value for the first parameter comprises user input selecting the parameter value from the set of possible parameter values.

13. The computer-readable memory medium of claim 1, wherein the first parameter represents an object;
   wherein the graphical user interface enables a user to view object names;
   wherein the user input to the graphical user interface selecting the parameter value for the first parameter comprises user input selecting a first object name; and
   wherein said inserting the selected parameter value for the first parameter in the first function call comprises inserting the first object name in the first function call.

14. The computer-readable memory medium of claim 1, wherein the first parameter represents a file;
   wherein the graphical user interface enables a user to view file names;
   wherein the user input to the graphical user interface selecting the parameter value for the first parameter comprises user input selecting a first file name; and wherein said inserting the selected parameter value for the first parameter in the first function call comprises inserting the first file name in the first function call.

15. The computer-readable memory medium of claim 1,
wherein the first parameter represents a uniform resource locator (URL);
wherein the graphical user interface enables a user to view URLs;
wherein the user input to the graphical user interface selecting the parameter value for the first parameter comprises user input selecting a first URL; and
wherein said inserting the selected parameter value for the first parameter in the first function call comprises inserting the first URL in the first function call.

16. The computer-readable memory medium of claim 1, wherein the program instructions are further executable to:
dynamically determine a set of valid parameter values for the first parameter;
wherein the graphical user interface displays the dynamically determined set of valid parameter values;
wherein the user input to the graphical user interface selecting the parameter value for the first parameter comprises user input selecting a parameter value from the set of valid parameter values.

17. The computer-readable memory medium of claim 16,
wherein said dynamically determining the set of valid parameter values for the first parameter comprises dynamically determining the set of valid parameter values based on one or more of:
a current configuration of a computer system;
a type of a device coupled to a computer system;
a current configuration of a device coupled to a computer system; and/or
a current state of data stored in a file.

18. The computer-readable memory medium of claim 16,
wherein the first parameter has a set of possible parameter values;
wherein said dynamically determining the set of valid parameter values for the first parameter comprises determining a subset of valid parameter values from the set of possible parameter values;
wherein the subset of valid parameter values does not include all parameter values from the set of possible parameter values;
wherein the graphical user interface prevents a user from selecting a parameter value that is in the set of possible parameter values but not in the subset of valid parameter values.

19. The computer-readable memory medium of claim 16,
wherein said dynamically determining the set of valid parameter values for the first parameter comprises dynamically determining the set of valid parameter values based on the source code in the computer program.

20. The computer-readable memory medium of claim 16,
wherein the first function call also takes a second parameter, wherein displaying the first function call comprises displaying within the first function call parameter value for the second parameter;
wherein said dynamically determining the set of valid parameter values for the first parameter comprises dynamically determining the set of valid parameter values based on the parameter value for the second parameter displayed within the first function call.

21. The computer-readable memory medium of claim 1,
wherein the GUI element corresponding to the first parameter has a graphical appearance that visually indicates to a user that user input to the GUI element causes the graphical user interface for selecting the parameter value for the first parameter to be displayed.

22. The computer-readable memory medium of claim 1,
wherein the GUI element corresponding to the first parameter comprises a button.

23. The computer-readable memory medium of claim 22,
wherein said receiving user input to the GUI element corresponding to the first parameter comprises receiving a click from an input device to the button.

24. A method comprising:
in source code of a computer program, displaying a first function call written in a programming language that can be compiled into executable code, wherein the first function call takes a first parameter;
in response to detecting that a cursor is positioned within the first function call, displaying a GUI element corresponding to the first parameter;
in response to receiving user input to the GUI element corresponding to the first parameter, displaying a graphical user interface for selecting a parameter value for the first parameter; and
in response to user input to the graphical user interface selecting a parameter value for the first parameter, automatically modifying the first function call displayed in the source code by inserting the selected parameter value for the first parameter in the first function call, wherein said inserting modifies the source code.

25. A system comprising:
one or more processors;
a display device; and
memory storing program instructions;
wherein the program instructions are executable by the one or more processors to:
in source code of a computer program, display a first function call written in a programming language that can be compiled into executable code, wherein the first function call takes a first parameter;
in response to detecting that a cursor is positioned within the first function call, display a GUI element corresponding to the first parameter on the display device;
in response to receiving user input to the GUI element corresponding to the first parameter, display a graphical user interface for selecting a parameter value for the first parameter on the display device; and
in response to user input to the graphical user interface selecting a parameter value for the first parameter, automatically modify the first function call displayed in the source code by inserting the selected parameter value for the first parameter in the first function call, wherein said inserting modifies the source code.

26. A computer-readable memory medium for creating a computer program, the computer-readable memory medium storing program instructions executable to:
in source code of the computer program, display a first function call written in a programming language that can be compiled into executable code, wherein the first function call takes a first parameter;
display a function prototype for the first function call;
display a GUI element corresponding to the first parameter of the first function call within the function prototype for the first function call, wherein the GUI element has a graphical appearance visually indicating that user input to the GUI element causes a graphical user interface for selecting a parameter value for the first parameter to be displayed;

in response to receiving user input to the GUI element corresponding to the first parameter, display the graphical user interface for selecting a parameter value for the first parameter; and in response to user input to the graphical user interface selecting a parameter value for the first parameter, automatically modify the first function call displayed in the source code by inserting the selected parameter value for the first parameter in the first function call, wherein said inserting modifies the source code.

27. A system comprising:

one or more processors;

a display device; and memory storing program instructions;

wherein the program instructions are executable by the one or more processors to:

in source code of a computer program, display a first function call written in a programming language that can be compiled into executable code, wherein the first function call takes a first parameter;

display on the display device a function prototype for the first function call;

display on the display device a GUI element corresponding to the first parameter of the first function call within the function prototype for the first function call, wherein the GUI element has a graphical appearance visually indicating that user input to the GUI element causes a graphical user interface for selecting a parameter value for the first parameter to be displayed;

in response to receiving user input to the GUI element corresponding to the first parameter, display on the display device the graphical user interface for selecting a parameter value for the first parameter; and in response to user input to the graphical user interface selecting a parameter value for the first parameter, automatically modify the first function call displayed in the source code by inserting the selected parameter value for the first parameter in the first function call, wherein said inserting modifies the source code.

28. A computer-readable memory medium for creating a computer program, the computer-readable memory medium storing program instructions executable to:

detect that a cursor of a source code window displaying source code of the computer program is positioned on a first parameter in a first function call, wherein the first parameter in the first function call comprises an undeclared variable;

receive user input requesting a variable declaration for the undeclared variable to be automatically added to the source code of the computer program;

determine a first location in the source code to insert the variable declaration for the undeclared variable in response to the user input; and automatically insert the variable declaration for the undeclared variable at the first location in the source code, wherein said inserting modifies the source code.

29. The computer-readable memory medium of claim 28, wherein the first parameter has a first data type;

wherein said automatically inserting the variable declaration for the undeclared variable comprises automatically inserting a variable declaration to declare a variable of the first data type.

30. The computer-readable memory medium of claim 29, wherein the program instructions are further executable to:

analyze a function prototype for the first function call to determine that the first parameter has the first data type.

31. The computer-readable memory medium of claim 28, wherein the first parameter has a data type that can vary;

wherein the program instructions are further executable to determine a first data type for the variable declaration based on one or more values of one or more parameters in the first function call other than the first parameter;

wherein said automatically inserting the variable declaration for the undeclared variable comprises automatically inserting a variable declaration to declare a variable of the first data type.

32. The computer-readable memory medium of claim 28, wherein the program instructions are further executable to:

prompt the user to select a first data type for the variable declaration;

wherein said automatically inserting the variable declaration for the undeclared variable comprises automatically inserting a variable declaration to declare a variable of the first data type selected by the user.

33. The computer-readable memory medium of claim 28, wherein the first parameter of the first function has a first array data type;

wherein the program instructions are further executable to prompt the user to specify a number of array elements for the variable declaration;

wherein said automatically inserting the variable declaration for the undeclared variable comprises automatically inserting a variable declaration to declare an array having the specified number of array elements.

34. The computer-readable memory medium of claim 28, wherein the cursor is located within a first program block;

wherein said determining the first location to insert the variable declaration comprises one or more of:

determining a location at the beginning of the first program block to insert the variable declaration; or determining a location near the beginning of the first program block to insert the variable declaration.

35. The computer-readable memory medium of claim 28, wherein said receiving user input requesting the variable declaration for the undeclared variable to be automatically added to the computer program comprises one of:

receiving user input comprising a hotkey keystroke; or receiving user input selecting a menu item.

36. A method comprising:

detecting that a cursor of a source code window displaying source code of a computer program is positioned on a first parameter in a first function call, wherein the first parameter in the first function call comprises an undeclared variable;

receiving user input requesting a variable declaration for the undeclared variable to be automatically added to the source code of the computer program;

determining a first location in the source code to insert the variable declaration for the undeclared variable in response to the user input; and automatically inserting the variable declaration for the undeclared variable at the first location in the source code, wherein said inserting modifies the source code.

37. A system comprising:

a processor; and a memory medium storing program instructions;

wherein the processor is operable to execute the program instructions to:

detect that a cursor of a source code window displaying source code of a computer program is positioned on a first parameter in a first function call, wherein the first parameter in the first function call comprises an undeclared variable;

receive user input requesting a variable declaration for the undeclared variable to be automatically added to the source code of the computer program;

determine a first location in the source code to insert the variable declaration for the undeclared variable in response to the user input; and automatically insert the variable declaration for the undeclared variable at the first location in the source code, wherein said inserting modifies the source code.

\* \* \* \* \*